United States Patent [19]
Ostergaard et al.

[11] Patent Number: 5,994,878
[45] Date of Patent: Nov. 30, 1999

[54] METHOD AND APPARATUS FOR CHARGING A RECHARGEABLE BATTERY

[75] Inventors: Kim Ostergaard, Lyngby; Otto Martinus Nielsen, Hørsholm; Kim Arthur Stück Andersen, Blålersvej; Jesper Michelsen, Aldershvilevej; Kim Rasmussen, Søgårdsvej, all of Denmark

[73] Assignee: Chartec Laboratories A/S, Charlottenlund, Denmark

[21] Appl. No.: 09/153,126

[22] Filed: Sep. 15, 1998

[51] Int. Cl.[6] .......................... H01M 10/44; H01M 10/46
[52] U.S. Cl. .......................... 320/132; 320/134; 320/136
[58] Field of Search .................................... 320/124, 125, 320/132, 134, 136, DIG. 18, DIG. 19, DIG. 21

[56] References Cited

U.S. PATENT DOCUMENTS

| | | |
|---|---|---|
| 5,028,860 | 7/1991 | Amano . |
| 5,585,749 | 12/1996 | Pact et al. ........................... 340/825.44 |
| 5,604,418 | 2/1997 | Andrieu et al. . |
| 5,606,240 | 2/1997 | Kokuga et al. . |
| 5,631,537 | 5/1997 | Armstrong . |
| 5,637,981 | 6/1997 | Nagai et al. . |
| 5,640,080 | 6/1997 | Tamai et al. . |
| 5,654,622 | 8/1997 | Toya et al. . |
| 5,663,629 | 9/1997 | Hinohara . |
| 5,670,862 | 9/1997 | Lewyn . |

FOREIGN PATENT DOCUMENTS

0 820 138 A2   1/1998   European Pat. Off. .

OTHER PUBLICATIONS

EPO Standard Search Report from foreign priority application, DKA 145697, Jun. 5, 1998.

Benchmarq Microelectronics Preliminary data sheet for bq2056/T/V "Low–Dropout Lio–Ion Charge–Control IC With AutoComp Charge–Rate Compensation", dated as Mar. 1998 pp. 1–12.

Benchmarq Microelectronics data sheet for bq2053x, "Lithium Ion Pack Supervisor", dated as Sep. 1996, pp. 1–10.

Benchmarq Microelectronics data sheet for bq2153, "Li–Ion Pack Supervisor Module", dated as May 1996, pp. 1–8.

Benchmarq Microelectronics data sheet fo rbq2165, "Li–Ion Gas Gauge Module With Pack Supervisor", dated as May 1996, pp. 1–10.

J–M. Ravon and L. Wuidart, An Intelligent One Hour Multicharger for Li–Ion, NiMH and NiCD Batteries, SGS–Thomson Microelectronics application note AN859/ 0496, copyright date specified only as 1996, pp. 1–12.

*Primary Examiner*—Edward H. Tso
*Attorney, Agent, or Firm*—Edwin A. Suominen; William R. Bachand; Souire, Sanders & Dempsey L.L.P.

[57] ABSTRACT

In a system and method for charging a rechargeable battery having a protection circuit, the rechargeable battery operates according to a model that includes an ideal battery and an internal resistance. In the model, an electrode voltage develops across the ideal battery. An internal voltage drop equal to the difference between this electrode voltage and the battery voltage is developed across the internal resistance. The battery is charged with a charging voltage that may exceed the threshold voltage and the electrode voltage. The charging system and method ensures that (1) the voltage at the protection circuit is kept below the threshold voltage and (2) the electrode voltage is kept below the end-of-charge voltage.

48 Claims, 13 Drawing Sheets

METHOD AND APPARATUS FOR CHARGING A RECHARGEABLE BATTERY

CROSS-REFERENCE TO RELATED APPLICATIONS

This application claims benefit of Danish application(s): (1) Danish Application No. DK 1124/97 filed on Sep. 30, 1997, (2) Danish Application No. DK 1456/97 filed on Dec. 15, 1997 and (3) Danish Application No. DK 0129/98 filed on Jan. 29, 1998. All three applications are currently assigned to Chartec Laboratories A/S.

BACKGROUND

The present invention relates to a method and an apparatus for charging a rechargeable battery. More particularly, the present invention is directed to voltage controlled charging of batteries connected to a protection circuit.

NiCd (Nickel-Cadmium) and NiMH (Nickel-Metal-Hydride) rechargeable batteries are conventionally charged with a relatively high constant charging current until they provide an indication of full charge. Such indications include a sudden increase in the battery temperature and a drop in the terminal voltage of the battery. However, batteries based on lead and lithium chemistries (including lithium-ion, lithium-polymer and lithium solid state) do not provide these types of indications when reaching a fully charged state. Consequently, a conventional process for charging a battery with this type of chemistry involves monitoring the battery voltage to determine when the battery is fully charged.

A conventional lithium-based battery pack has maximum voltage specifications that should be observed for safe charging. One of these is a specified maximum charging voltage that is allowed to be applied to the terminals of the battery pack. It is desirable to keep the charging voltage at or below this predetermined maximum to avoid excessive generation of heat from resistive losses in the terminals.

A conventional electrical model for a lithium-based battery pack includes terminals and a battery electrically separated from the terminals by a terminal resistance and a protection diode. When charging current is applied to the battery pack, a voltage drop develops between the battery pack terminals and the battery inside it. The battery itself may be viewed as a series electrical connection between an ideal battery (comprising one or more cells) and an internal resistance. When charging current is applied to the battery pack, a voltage drop also develops between the internal resistance and the ideal battery.

A terminal voltage is measured across the terminals of the battery pack. The terminal voltage is the sum of two voltages: an internal battery voltage developed across the ideal battery, also known as an electrode voltage, and a terminal voltage drop from the battery pack terminals to the ideal battery. To determine the electrode voltage, the terminal voltage drop may be subtracted from the terminal voltage based on prior knowledge of the magnitude of the terminal voltage drop. Alternatively, the electrode voltage may be determined by measuring the battery voltage with negligible charging current.

Another important voltage specification of a lithium-based battery pack is an end-of-charge voltage. This is the electrode voltage developed across the ideal battery when it is fully charged. It is desirable to keep the electrode voltage from exceeding the end-of-charge voltage to avoid damage to the battery inside the battery pack.

The battery pack commonly includes a protection circuit that monitors a battery voltage, which is a voltage across the battery inside the battery pack. When charging with a high charging current, the monitored battery voltage is larger than the electrode voltage due to an internal voltage drop developed across the internal resistance of the battery. When charging with a low charging current, the internal voltage drop is small and the monitored battery voltage is close to the electrode voltage.

The protection circuit is conventionally used as a safety device which may be triggered to avoid substantially overcharge of the battery. The threshold voltage of the protection circuit may be set so that the protection circuit triggers when the monitored battery voltage exceeds the end-of-charge voltage by a predetermined amount.

The electrode voltage of the battery is kept at or below the end-of-charge voltage to prevent overcharging. In a conventional charging method, the maximum charging voltage may be defined as the end-of-charge voltage. The provided battery terminal voltage should not exceed this end-of-charge voltage.

Such a conventional method of charging a lithium-based battery avoids overcharging. However, the terminal voltage reaches the end-of-charge voltage very quickly when compared to the electrode voltage. This results in a decrease in the charging current at an early stage and a consequent inefficiency in charging.

SUMMARY OF THE INVENTION

According to various aspects of the present invention, a battery pack, which includes a rechargeable battery and a protection circuit, is charged at a high charging rate without having the charging process interrupted by the protection circuit.

The battery pack includes two or more terminals (for accepting a charging current), a rechargeable battery, and a protection circuit. The rechargeable battery is coupled to the terminals. When a charging voltage is developed across the terminals, a battery voltage is developed across the rechargeable battery. The difference between these two voltages forms part of a terminal voltage drop. A protection circuit monitors the battery voltage to ensure that it does not exceed a predetermined threshold voltage. If the battery voltage exceeds the threshold voltage, the protection circuit causes charging current to be stopped. By interrupting charging current, damage to the battery is avoided.

The rechargeable battery operates according to a model that includes an ideal battery and an internal resistance. In the model, an electrode voltage develops across the ideal battery. Also in the model, an internal voltage drop equal to the difference between this electrode voltage and the battery voltage (for example, the voltage monitored by a protection circuit) is developed across the internal resistance. The internal voltage drop is proportional to the charging current supplied through the terminals of the battery pack. When the rechargeable battery is fully charged, the ideal battery develops an electrode voltage that is made substantially equal to a specified end-of-charge voltage. In accordance with various aspects of the present invention, the electrode voltage does not exceed the specified end-of-charge voltage.

According to a first method of the present invention, charging current is supplied to the terminals at a rate that maintains the voltage monitored by the protection circuit (the monitored battery voltage) to be above the end-of-charge voltage and to be below the threshold voltage of the protection circuit. By allowing the monitored battery voltage to exceed the specified end-of-charge voltage, a rapid charging process is realized even with a functioning protection circuit in the battery pack. The monitored battery voltage is not allowed to exceed the threshold voltage of the protection circuit; consequently, the protection circuit does not cause the supplied charging current to be stopped.

In accordance with the first method of the invention, the charging current may then further be diminished to maintain the monitored battery voltage to be below the threshold voltage of the protection circuit. However, at this point, the monitored battery voltage may exceed the end-of-charge voltage, allowing rapid charging of the battery to continue. The rechargeable battery is charged without the battery voltage exceeding the threshold voltage of the protection circuit. Accordingly, the protection circuit is prevented from causing charging current to be stopped.

According to a second method of the present invention, a charging process begins by supplying charging current to the battery pack at a constant current rate. The current is supplied at about 1–2 times the capacity of the battery pack in amp-hours divided by one hour. The charging process then supplies charging current so as to maintain the charging voltage to be at or below a specified maximum charging voltage. The maximum charging voltage is specified to prevent the battery voltage from exceeding the threshold voltage of the protection circuit and to prevent excessive ohmic losses in the terminals of the battery pack. While the charging voltage is being maintained at the specified maximum charging voltage, the monitored battery voltage increases because the supplied charging current is diminishing as the battery becomes more fully charged. Consequently, the voltage differential between the charging voltage and the monitored battery voltage is also diminished. Since the charging voltage is being held constant at this point, the battery voltage increases.

As the charging process continues according to the second method of the invention, the electrode voltage of the ideal battery increases as it is charged. Consequently, the internal voltage drop across the internal resistance decreases. The electrode voltage, according to an aspect of the present invention, is prevented from exceeding the end-of-charge voltage. The charging current is supplied to maintain the electrode voltage at or below this end-of-charge voltage. The charging voltage is prevented from exceeding the maximum charging voltage and the electrode voltage is prevented from exceeding the end-of-charge voltage.

In another embodiment at the present invention, a battery pack includes an information storage device for storing charging parameters. Such parameters may include the maximum charging voltage, the maximum charging current, the threshold voltage of the protection circuit, and the end-of-charge voltage. The charger receives the parameters from the battery pack and controls the charging process as discussed above.

In yet another embodiment of the present invention, the protection circuit is omitted from the battery pack.

BRIEF DESCRIPTION OF THE DRAWINGS

Embodiments of the present invention will now be further described with reference to the drawing, in which.

DETAILED DESCRIPTION OF PREFERRED EXEMPLARY EMBODIMENTS

Figure 1:
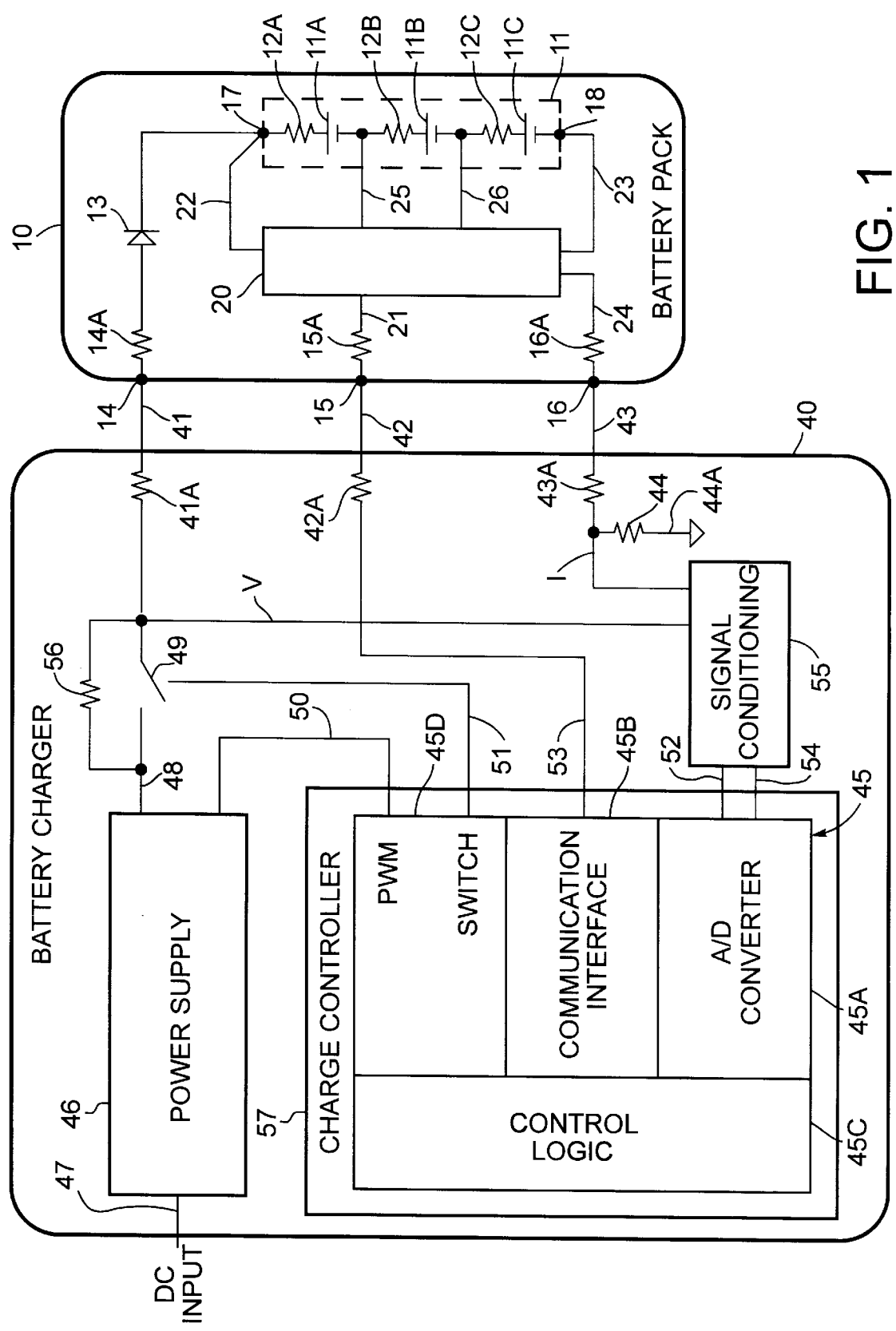
FIG. 1 is a block diagram of a battery charging apparatus and a battery pack according to various aspects of the present invention.

A functional block diagram of an embodiment of the present invention is illustrated in FIG. 1, which shows a battery pack 10 to be charged by a battery charger 40. Battery pack 10 includes a rechargeable battery 11, modeled as a number of series connected individual cells 11A, 11B, 11C of an ideal battery and corresponding internal cell resistances 12A, 12B, 12C; a supervisor 20 having a protection circuit; a protection diode 13; and battery pack terminals 14, 15, 16, each having a corresponding terminal loss resistance 14A, 15A, 16A. Battery voltage is provided across battery pack terminals 14 and 16, while battery pack terminal 15 is connected to an input/output 21 of supervisor 20 for communication between battery pack 10 and charger 40. Preferably, input/output 21 uses serial format for single line communication. Alternatively, a communication bus having two or more communication lines may be used to communicate data from battery pack 10 to charger 40. A suitable communication bus may be a conventional System Management Bus (SMBus). Supervisor 20 has terminals 22, 23 and 24 which are connected respectively to a positive terminal 17 of battery 11, a negative terminal 18 of battery 11, and negative battery pack terminal 16. Preferably, supervisor 20 also has terminals 25 and 26 for monitoring individual voltages of battery cells, 11A, 11B, and 11C.

Battery charger 40 has charger terminals 41, 42, 43, each having a corresponding terminal loss resistance 41A, 42A, and 43A. When charging battery pack 10, charger terminals 41, 42, 43 are connected to battery pack terminals 14, 15, 16, respectively. Charger 40 also includes a power supply 46, a charge controller 57, a signal conditioning circuit 55, and a current sense resistor 44 connected between charger terminal 43 and ground 44A. Charge controller 57 includes microcontroller circuit 45, which may include a conventional integrated circuit microcontroller. Microcontroller circuit 45 includes control logic 45C, a communication interface 45B, an A/D converter 45A and discrete digital outputs 45D for power supply control (e.g., signal PWM on line 50) and charging current control (e.g., signal SWITCH on line 51).

When charging battery pack 10, the charging current creates a voltage drop across resistor 44. Preferably, current sense resistor 44 has a very low value (e.g. 0.1 ohm). A voltage signal I corresponding to the voltage drop is fed to conditioning circuit 55. Signal conditioning circuitry 55 may include an operational amplifier to provide a suitable output.

Signal conditioning circuit 55 converts terminal voltage measured on line V and the charging current measured on line I to voltage output signals suitable for A/D converter inputs 52 and 54 of microcontroller circuit 45.

Signal conditioning circuit 55 prepares signal I for conversion from analog to digital form by conventional scaling and filtering. Analog-to-digital (A/D) converter 45A receives the conditioned signal on line 54. Signal conditioning circuit 55 also receives a voltage signal V having a voltage corresponding to the battery terminal voltage. Signal conditioning circuit 55 prepares signal V for conversion from analog to digital by conventional scaling and filtering. A/D converter 45A measures signals on lines 54 and 52 with reference to ground 44A. A/D converter 45A receives the conditioned signal on line 52. Control logic 45C receives digital values for battery voltage and for charging current from A/D converter 45A.

The communication signal from battery pack terminal 15 is received on line 53 by communication interface 45B of microcontroller circuit 45. Control logic 45C receives charging parameters from communication interface 45B.

Signal conditioning circuit 55 may include a voltage divider for providing a suitable power source for microcontroller circuit 45 from the battery terminal voltage. The battery terminal voltage may exceed 5 Volts. The supply voltage for microcontroller circuit 45 is preferably around 5 Volts.

Power supply 46 (preferably a switch mode power supply) has a power input 47 which is supplied with a DC voltage. When battery 11 has three cells, as is preferred, 15–20 volts is supplied at power input 47. When battery 11 has one or two cells, less DC voltage may be supplied to power input 47. Power supply 46 has an output terminal 48 which provides charging current through terminals 41 and 14, preferably through a switch 49. The charging output 48 of power supply 46 is controlled from a control output 50 of microcontroller circuit 45. When power supply 46 is a switch mode power supply, control output 50 is preferably a PWM (pulse wide modulated) signal. This signal may be fed to a filter (not shown) for conversion into a variable analog voltage, which is then used for the control of power supply 46. When using a PWM control signal 50, microcontroller circuit 45 controls the power output to battery 10 via terminal 48 by controlling the duration of "on" and "off" periods of the PWM signal.

Microcontroller circuit 45 preferably comprises a switch control output 51 for switching the switch 49 on and off. Switch 49 may be turned off at short time intervals during the charging process to measure an open circuit voltage of the battery (indicative of the electrode voltage). This removes the internal voltage drop, which otherwise would be developed across internal resistances 11A, 11B, and 11C, when measuring the voltage of battery terminals 17 and 18. When the battery includes protection diode 13, a bypass resistor 56 is used to connect charging output 48 to terminal 41, positively biasing protection diode 13. Bypass resistor 56 preferably has a value (e.g. 1 K ohm) that will only allow a small current to flow into battery pack 10.

Charger 40 supplies charging current to battery pack 10. Charging current creates voltage drops across terminal resistances 41A, 43A of charger 40 and terminal resistances 14A, 16A of battery pack 10. The charging current also creates voltage drops across internal resistances 12A, 12B, 12C of battery 11, across an internal resistance (not shown) of supervisor 20, across sense resistor 44, and across protection diode 13. The sum of these voltage drops is the terminal voltage drop that constitutes part of the charging voltage. The terminal voltage drop is subtracted from the voltage measured by microcontroller circuit 45 at terminal 41 to determine the electrode voltage of battery 11. This electrode voltage is also referred to as the resistance free battery voltage. The terminal voltage drop is proportional to the charging current. For low charging currents, the terminal voltage drop will be close to the voltage drop of protection diode 13 or, when no protection diode is present, close to zero. When the electrode voltage is measured with switch 49 open, only a small charging current is allowed to flow through bypass resistor 56. Consequently, the measured battery terminal voltage may provide a good measurement for the control of the electrode voltage.

Microcontroller circuit 45, which for example may include a COP 8ACC marketed by National Semiconductor, is programmed to implement battery charging in accordance with various aspects of the present invention. Microcontroller circuit 45 controls the power delivered from power supply 46 to battery pack 10. In various embodiments, control may be based upon a measurement of charging current conveyed via line 54 and a measurement of terminal voltage via line 52.

In the embodiment of FIG. 1, the signals received by microcontroller circuit 45 also include a single line communication signal from battery pack 11, conveyed via line 53. Microcontroller circuit 45 includes communication interface 45B, that is programmed to handle the communication to and from battery pack 10.

When supervisor 20 has a communication port 21 for communicating with microcontroller circuit 45, supervisor 20 includes a circuit for communicating information to microcontroller circuit 45. For microcontroller circuit 45 to select the right charging algorithm and/or charging parameters, supervisor 20 may include information about the battery type and size, and may communicate such information to microcontroller circuit 45 via line 53. Supervisor 20 may also include circuitry for measuring the temperature of battery pack 10 and for communicating information of the measured temperature of battery 11 to microcontroller circuit 45.

Figure 2:
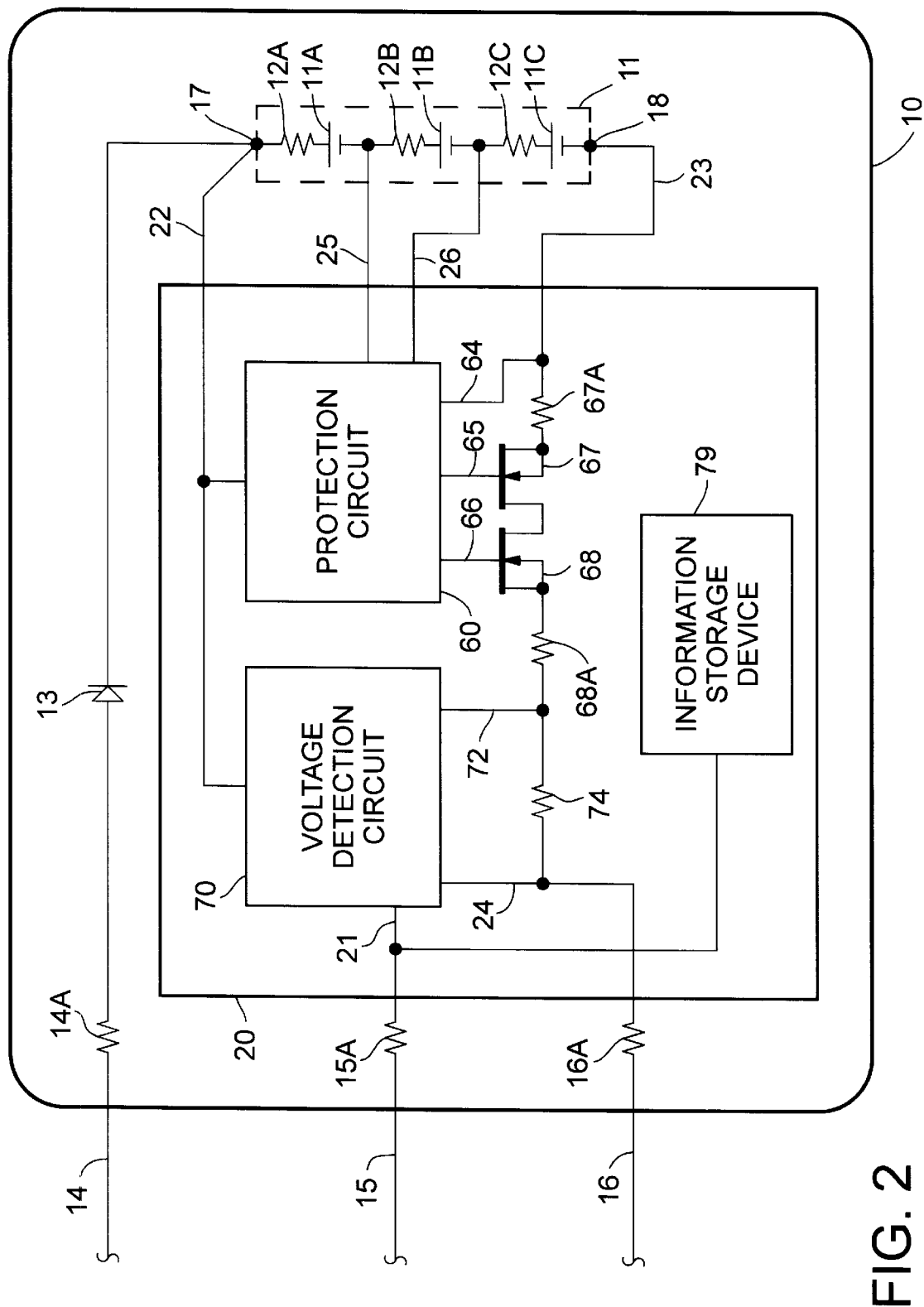
FIG. 2 is a circuit diagram showing an embodiment of a battery pack charged according to the present invention.

FIG. 2 shows a preferred embodiment of battery pack 10. Like reference numerals in FIG. 2 refer to like elements of in FIG. 1. Supervisor 20 of FIG. 2 includes protection circuit 60 for protecting battery 11 from being overcharged. The charging process is interrupted when the battery voltage or cell voltage exceeds a predetermined threshold voltage $V_{OV}$. Protection circuit 60 may also control the enabling of the charging process, allowing charging only when the battery voltage or cell voltage is below a predetermined charge enable voltage $V_{CE}$. Hence, when a charging process is interrupted due to a battery voltage or cell voltage reaching $V_{OV}$, the charging process cannot be continued before the battery voltage or cell voltage has decreased to $V_{CE}$. The protection circuit 60 may also be adapted to protect battery 11 from being over-discharged by interrupting the discharging process if the battery voltage or cell voltage gets lower than a predetermined discharging threshold voltage $V_{UV}$.

Although protection circuit 60 may be adapted to only monitor the total voltage of battery 11 (e.g. between terminals 17 and 18), it is preferred that each cell be monitored to secure detection of damage to any single cell. Thus, each cell may have its positive and negative pole connected to protection circuit 60. For the embodiment of FIGS. 1 and 2, battery pack 10 includes a 3-cell lithium-ion battery with cell 11A connected via lines 22 and 25, cell 11B connected via lines 25 and 26, and cell 11C connected via lines 26 and 23. Protection circuit 60 controls switches 67 and 68 via lines 65 and 66. These switches are preferably MOSFET transistors each having a corresponding internal loss resistance 67A and 68A. Each loss resistance 67A, 68A may have a value of about 50 milliohm. When threshold voltage $V_{OV}$ is reached, the charging process is interrupted by opening switch 68 via line 66. And, when discharging threshold voltage $V_{UV}$ is reached, the discharging process is interrupted by opening switch 67 via line 65.

An example of a protection circuit operating as described above is the bq2053 marketed by BENCHMARQ Microelectronics, Inc. Further details of this circuit may be found in the bq2053 data sheet of September 1996 published by BENCHMARQ Microelectronics, Inc., hereby incorporated by reference. Here, the threshold voltage $V_{OV}$ is set at 4.20 V/cell with a tolerance of ±1.5%. Thus, for the 3-cell battery as shown, the total battery threshold voltage is 12.6 V. Charge enable voltage $V_{CE}$ is set at ($V_{OV}$-100 mV±50 mV). The discharging threshold voltage $V_{UV}$ is set at (2.3 V±100 mV)/cell.

Supervisor 20 may further include a voltage detection circuit 70 for measuring battery voltage (e.g. between terminals 17 and 18) applied to supervisor 20 on lines 22 and 72. Circuit 70 includes preferably a conventional gas gauge circuit. A suitable gas gauge circuit is the bq2050 marketed by BENCHMARQ Microelectronics, Inc., a description of which may be found in the bq2050 data sheet of September 1996 published by BENCHMARQ Microelectronics, Inc., hereby incorporated by reference. This data sheet also describes communicating with the bq2050 and programming a communication interface, for example communication interface 45B of FIG. 1. BENCHMARQ Microelectronics, Inc. also supplies a fully connected supervisor circuit bq2165, which comprises both the bq2053 and the bq2050. Further details of this circuit can be found in the bq2165 data sheet of May 1996 published by BENCHMARQ Microelectronics, Inc., hereby incorporated by reference.

Circuit 70 monitors the charging/discharging current by measuring the voltage drop across sense resistor 74 via lines 72 and 24. The protection circuit voltage is measured via lines 22 and 72. When charging current is supplied, there is a difference between the voltage across lines 22 and 23 to protection circuit 60 and the voltage across lines 22 and 72 to voltage detection circuit 70, due to loss resistances 67A and 68A. By monitoring the battery voltage of battery 11 and the charging/discharging current, voltage detection circuit 70 determines the power delivered to (and supplied by) battery 11 and the remaining capacity of battery 11. When adapted to measure the temperature of battery 11, voltage detection circuit 70 may compensate for temperature variations when determining the remaining capacity. When measuring the charging current, sense resistor 74 should be a low value such as 50 milliohm in order to reduce the voltage drop across resistor 74. Voltage detection circuit 70 includes a serial input/output pin 21, for serial communication with microcontroller circuit 45, shown in FIG. 1. Circuit 70 may transmit voltage, current, temperature, and/or battery capacity data via serial input/output 21.

Supervisor 20 includes an information storage device 79, in which information including charging parameters is stored. When battery 11 is connected to charger 40, communication interface 45B reads or senses information stored in device 79. Charging of battery 11 may be controlled based on the charging parameters read or sensed.

In various embodiments of the present invention, protection circuit 60 is adapted to interrupt the charging process when the threshold voltage is reached. In other embodiments, protection circuit 60 is adapted to interrupt charging when one of a plurality of battery cells reaches a cell threshold voltage. For batteries having a single cell the cell threshold voltage and the battery threshold voltage are equal.

In the embodiment of FIG. 2, voltage detection circuit 70 is adapted to measure the aggregate voltage of all three cells 11A, 11B, 11C of battery 11. A signal corresponding to this voltage is communicated via line 15 to microcontroller circuit 45 (shown in FIG. 1). Microprocessor circuit 45 controls the output of power supply 46 during at least part of the charging process so as to maintain this aggregate voltage below the threshold voltage (e.g. 12.6 V for a 3-cell battery). In a variation, voltage detection circuit 70 measures the voltage across each of the cells of a battery having more than one cell. Hence, the charging process may be controlled so that the cell voltage of each cell is maintained below the single cell threshold voltage.

A charger of the present invention allows a high charging rate without triggering protection circuit 60. As shown, protection circuit 60 is triggered when the voltage developed across battery 11 reaches the threshold voltage. In a variation, protection circuit 60 is triggered when the voltage developed across any cell 11A, 11B, 11C reaches the cell threshold voltage. The highest battery voltage or cell voltage is obtained during periods in which battery 11 is charged with a high charging current. High charging current creates an internal voltage drop, which is the sum of voltage drops across the internal loss resistances 12A, 12B, 12C.

In embodiments of the present invention that do not include voltage detection circuit 70, the voltage measured when a charging current is supplied is the charging voltage measured at terminal 41 of FIG. 1 as discussed above with reference to signal V and ground 44A. This charging voltage includes the voltage of battery 11 plus the voltage drop across loss resistances 67A, 68A, across the terminal loss resistances 14A, 41A, 16A, 43A, and across sense resistor 44. In embodiments that include voltage detection circuit 70, the charging voltage also includes a voltage drop across sense resistor 74. In embodiments using battery pack 10 with protection diode 13, the charging voltage also includes the voltage drop across diode 13. A diode voltage drop of 300 mV is representative of Schottky-type diodes.

Terminal loss resistances 14A, 41A, 16A, 43A, 15A, 42A should preferably have very low resistance, on the order of 10 milliohm. Each resistance will vary, depending on the contact material used. A material such as beryllium-copper is a suitable choice for obtaining a low resistance value. The contact resistance between terminals 14, 15, 16 of battery pack 10 and charger terminals 41, 42, 43 should also be taken into account. This contact resistance may vary greatly, for example, from aging of the contacts and poor connections. Thus, a total terminal loss resistance across terminals 14, 41 or terminals 16, 43 may reach or even exceed 100 milliohm each.

As an example, the total voltage drop external to the battery cells (the terminal voltage drop minus the internal voltage drop) may be calculated for a charging current of 1 A with relevant reference numerals shown as subscripts:

$$V_{TOTAL} = I_{CHARGE} \times (R_{41-14} + R_{67A} + R_{68A} + R_{74} + R_{16-43} + R_{44}) + V_{13}$$

$$1 A \times [100 + 50 + 50 + 50 + 100 + 100] m\Omega + 300 \text{ mV} = 750 \text{ mV}.$$

If the voltage drop of diode 13 is also 300 mV with a 2 A charging current, the total voltage drop corresponding to the aforementioned resistance values for the 2 A current would be 1.2 V. When, for example, the threshold voltage is 12.6 V, a 2 A charging current may cause the battery terminal voltage to reach 13.8 V before the charging process is interrupted by protection circuit 60.

A maximum charging voltage may be determined and used as a limit in the charging process, allowing a high charging current and a consequent high charging voltage without interruption by the protection circuit. When used as a limit, the output of power supply 48 is controlled to prevent the charging voltage from exceeding this maximum charging voltage.

The voltage drop of diode 13 may be considered fixed at, for example, 300 mV. A more accurate representation of the diode voltage drop may be determined as a function of diode current, using the published data sheets for the particular diode used. For high currents, the diode voltage drop may be 400 mV. For a low charging current the diode voltage drop may be 200 mV. It is preferred to use 300 mV during the high current part of the charging process, whereas it is preferred to use 200 mV when correcting for the diode voltage drop in measured values of the open circuit voltage.

When using a low-resistance contact material, the connection loss resistance (not shown) may be around 10 milliohms. From experiments it has been found that a suitable choice for the total terminal loss resistance across terminals 41, 14 and terminals 16, 43 is 20 milliohms. These resistances combine to develop a voltage drop (external to the battery cells) of 600 mV at 1 A and 900 mV at 2 A (with a diode voltage drop of 300 mV).

Before determining the maximum charging voltage, variations in the threshold voltage should also be included. For a variation of ±1.5% on 12.6 V, the minimum threshold voltage is 12.411 V, which for safety reasons leads to a minimum threshold voltage of 12.4 V. Combined with the effect of terminal loss resistance, the maximum charging voltage may be set at 13.3 V for a 2 A charging current and 13.0 V for a 1 A charging current, thereby allowing a charging voltage higher than the threshold voltage.

The end-of-charge voltage for a lithium-ion battery used in an embodiment of the invention may be, for example, 4.1 V/cell, resulting in an end-of-charge voltage of 12.3 V for a 3-cell battery. A voltage window of 100 mV may be used between the end-of-charge voltage and the minimum threshold voltage. Voltage windows of 400 mV and 700 mV are obtained when correcting for the 300 mV diode voltage drop and while charging at 1 A and 2 A, respectively. As discussed above, the end-of-charge voltage is the battery terminal voltage of a fully (or almost fully) charged battery measured when charged with a low end-of-charge current, corresponding to the current supplied when measuring the electrode voltage.

The electrode voltage across the cells of an ideal battery should not exceed the end-of-charge voltage. However, the battery terminal voltage may exceed the end-of-charge voltage due to the internal voltage drops across internal resistances 12A, 12A, 12C of battery 11 when charging current is supplied. The higher the charging current, the higher the internal voltage drop.

When charging a lithium type battery at a maximum charging voltage, the charging current may begin to decrease when the charging process reaches the point at which the charging voltage reaches this maximum charging voltage. Consequently, the voltage monitored by the protection circuit may increase due to lower voltage drops in resistances (collectively, the terminal voltage drop). The corresponding decrease in terminal voltage drop may be taken into account when determining the maximum charging voltage.

When charging with a 2 A charging current, for example, battery pack 10 may be charged at a maximum charging voltage for a time until the charging current has decreased to a lower level (e.g. 1.5 A), at which point other control mechanisms may take over. Here, the maximum charging voltage should be determined from the terminal voltage drop that is induced by the lower current rate of 1.5 A. Thus, for the 2 A charging current, an allowance of about 750 mV may be preferred for terminal voltage drop as opposed to the previously calculated terminal voltage drop of 900 mV. This results in a maximum charging voltage of 13.15 V and a voltage window of 850 mV.

Embodiments of the present invention that comprise both protection circuit 60 and voltage detection circuit 70, may use other or additional methods of controlling the charging process. For example, the output of power supply 48 may be controlled during part of the charging process with reference to the protection circuit voltage monitored by voltage detection circuit 70. When charging current is supplied to the battery, the voltage sensed by voltage detection circuit 70 deviates from the voltage sensed by protection circuit 60 due to the voltage drop across switch loss resistances 67A and 68A. For switch loss resistances of about 50 milliohm per switch, charging currents of 1 A and 2 A may generate voltage drops of about 100 mV and 200 mV, respectively, across loss resistances 67A and 68A.

When charging the battery at a maximum protection circuit voltage during part of the charging process, the measured protection circuit voltage should preferably be corrected for the voltage drop across loss resistances 67A, 68A. This correction may be done by determining a correction voltage drop as a function of charging current, and adding this correction voltage drop to the minimum threshold voltage to obtain a maximum protection circuit voltage for the control of the charging process. However, it is preferred to use a constant maximum protection circuit voltage that takes the lower voltage drop across loss resistances 67A and 68A at lower charging currents into account.

In a preferred method of the present invention, the charging process is controlled so that the protection circuit voltage measured by circuit 70 does not exceed about 12.43 V. A voltage drop of about 30 mV is added to the minimum threshold voltage of 12.4 V. With an end-of-charge voltage of 12.3 V, a corrected maximum protection circuit voltage of 12.43 V gives a voltage window of 130 mV.

When charging a lithium battery in a maximum protection circuit voltage control mode, the charging current may decrease when the charging process proceeds from the point at which the maximum protection circuit voltage is reached. The internal voltage drop of the internal resistances 12A, 12B, 12C of the battery cells will decrease with decreasing charging current. The protection circuit voltage control mode is preferably followed by other charge control mechanisms in order to avoid overcharging of the battery. Overcharging may occur if the battery cells are charged to a higher voltage than the end-of-charge voltage.

It is preferred to measure the open circuit voltage (as described above) during periods in which switch 49 is open. This allows an internal substantially resistance-free detection of the electrode voltage, preferably corrected for the voltage drop across diode 13, if present.

In a preferred embodiment, charging in the protection circuit voltage control mode is terminated (by the charger, not by the protection circuit) when the open circuit voltage reaches the end-of-charge voltage (corrected for the effect of diode 13, which for the described embodiment corresponds to about 12.3 V+0.2 V, i.e. about 12.5 V). When this electrode voltage has been reached, it is preferred to further charge the battery by controlling the charging process so as to keep the electrode voltage below this corrected end-of-charge voltage.

Battery chargers and charging methods according to the present invention may be used, for example, for charging two different lithium-ion batteries. For example, a first 3-cell battery has a nominal capacity of 1300 mAh and a second 3-cell battery has a nominal capacity of 2600 mAh. The first battery is charged in an almost constant current mode with a maximum charging current of 1.2 A, while the second battery is charged with a maximum charging current of 2 A. During the charging process, the charging voltage, the protection circuit voltage and the open-circuit voltage are determined. The constant current charging mode is terminated when either (1) the charging voltage reaches the maximum charging voltage, (2) the protection circuit voltage reaches the threshold voltage, or (3) the open circuit voltage reaches the end-of-charge voltage. From this point, the charging process is controlled as described above, ending by charging each battery in an electrode voltage control mode, in which the electrode voltage is kept substantially at the end-of-charge voltage.

The electrode voltage control mode may be terminated when the charging current has decreased to a predetermined value, which is in the range of 60 mA for the first battery and 120 mA for the second battery. However, other values for the end-of-charge current may be used.

A charging process of the present invention may comprise both a charging voltage control mode and a protection circuit voltage control mode. In such an embodiment, the maximum charging voltage may be set to a higher value than it would be set for a process not including the protection circuit voltage control mode. The maximum charging voltage may be set so high as not to influence the charging process but merely act as a safety limit. However, when charging with high charging currents it may be an advantage to use a maximum charging voltage as a limit of charging voltage to influence the charging process so as not to dissipate too much power in the terminals and contacts of the battery pack and the charger.

Various charging processes of the present invention will now be discussed with respect to FIGS. 3–8.

Figure 3:
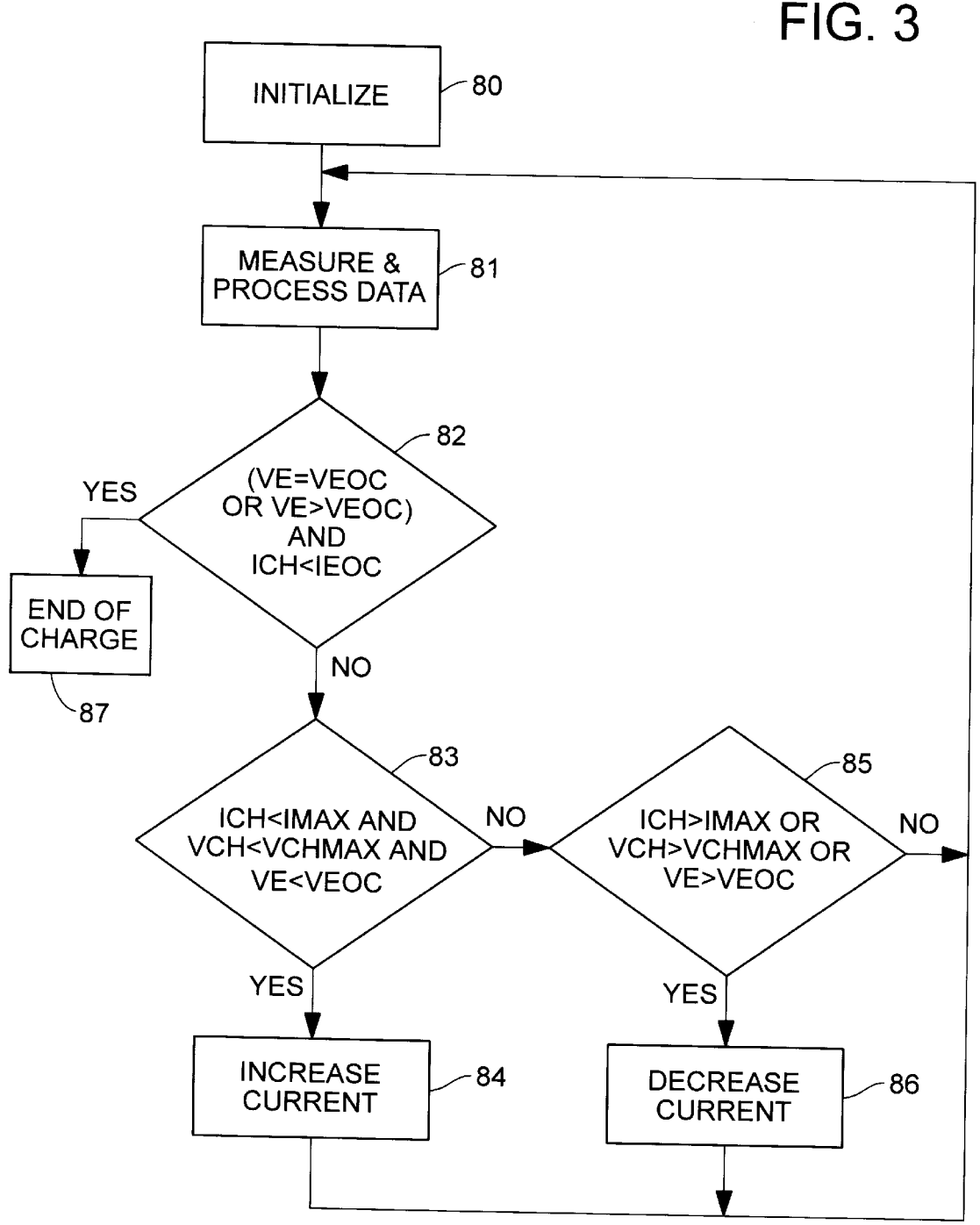
FIG. 3 is a flow chart illustrating a charging process according to various aspects of the present invention.

FIG. 3 shows a method for charging a rechargeable battery according to one embodiment of the present invention. Such a method begins at step 80. At step 80, battery pack 10, shown in FIG. 1, is connected to charger 40 and charge controller 57 is initialized. During initialization, charge controller 57 preferably reads a battery identifier via communication interface line 53. The identifier is used as a reference for addressing battery-specific predetermined charging parameters stored in charge controller 57. These parameters may include a maximum acceptable charging current $I_{MAX}$, a maximum acceptable charging voltage $V_{CHMAX}$, a maximum protection circuit voltage $V_{PCMAX}$, an end-of-charge voltage $V_{EOC}$, and/or an end-of-charge current $I_{EOC}$ characteristic of battery pack 10. The end-of-charge voltage $V_{EOC}$ is preferably corrected for the voltage drop across diode 13, providing calculation of a maximum open circuit voltage $V_{OCMAX}$ to be stored in charge controller 57. The battery-specific charging parameters need not be stored within charge controller 57, but may be stored in battery pack 10 and communicated to charge controller 57.

The value of $V_{CHMAX}$ is determined to safely ensure a high charging power. $V_{CHMAX}$ may be set to a point where charging is interrupted if high ohmic resistances or poor connections are present that introduce excessive voltage drops and consequent power loss. $V_{CHMAX}$ may be larger than $V_{EOC}$, but small enough to avoid interruption of charging by the protection circuit.

After the initialization of step 80, the charging process moves to step 81. Here, the charging begins with a predetermined low charging current. The charging process is controlled based on measured values of the charging current $I_{CH}$, the charging voltage $V_{CH}$ and the open circuit voltage which indicates the electrode voltage $V_E$. At step 81, data is measured and processed to determine the present values of $I_{CH}$, $V_{CH}$ and $V_E$. At the beginning of charging, $V_E$ is below $V_{EOC}$, so decision step 82 leads to decision step 83. Again, at the beginning of charging $I_{CH} < I_{MAX}$, $V_{CH} < V_{CHMAX}$ and $V_E < V_{EOC}$, so decision step 83 leads to step 84. At step 84, the charging current (and, consequently, charging power) is increased, preferably by increasing the duty cycle of PWM signal 50 which controls power supply 46, both shown in FIG. 1.

Preferably, the measurement of data at step 81 is performed within time frames or measurement periods at regular time intervals. The charging current $I_{CH}$ and the charging voltage $V_{CH}$ are measured when the full charging current is supplied via closed switch 49, shown in FIG. 1. The open circuit voltage is measured when the charging current is interrupted or reduced by opening switch 49. Thus, the charging power may be regulated at time intervals corresponding to the time intervals between successive periods of measurement of data.

During the first phase of the charging process, a charging current control mode, steps 81, 82, 83, and 84 are performed in a loop. The charging current is increased until $I_{CH}$ reaches $I_{MAX}$, at which point step 83 leads to decision step 85. If neither $V_{CH}$ or $V_E$ has reached its corresponding limit, $V_{CHMAX}$ and $V_{EOC}$, respectively, the charging current is maintained by performing steps 81, 82, 83 and 85 in a loop. However, if $I_{CH}$ is measured to be larger than $I_{MAX}$, the charging current is decreased at process step 86 by decreasing the duty cycle of PWM signal 50. When $I_{CH}$ has reached $I_{MAX}$, the charging process is controlled so as to charge in a constant charging current control mode until either $V_{CH}$ or $V_E$ reaches its limit.

During a charging process of the present invention, the charging voltage $V_{CH}$ may be the first to reach its limit $V_{CHMAX}$. At this point, steps 85 and 86 are performed to decrease the charging power. At this point, the charging process enters a constant charging voltage control mode in which $V_{CH}$ is held substantially constant while the charging current $I_{CH}$ is reduced. Performing steps 81, 82, 83, 85 and 86, or, for periods where there is no need for decreasing the current, steps 81, 82, 83 and 85, accomplish constant charging voltage control.

In FIG. 3, the value of $V_{CHMAX}$ is set to be larger than the value of $V_{EOC}$, and the charging voltage control mode is maintained until $V_E$ reaches $V_{EOC}$. At this point, the charging process enters an electrode voltage control mode, corresponding to steps 81, 82, 83, 85 and 86 performed as a loop. When no decrease in current is needed, the charging process performs steps 81, 82, 83 and 85 instead. The electrode voltage control mode is maintained until the charging current has been decreased to the end-of-charge current $I_{EOC}$. At this point, decision step 82 leads to a termination of the charging process at step 87.

Figure 4:
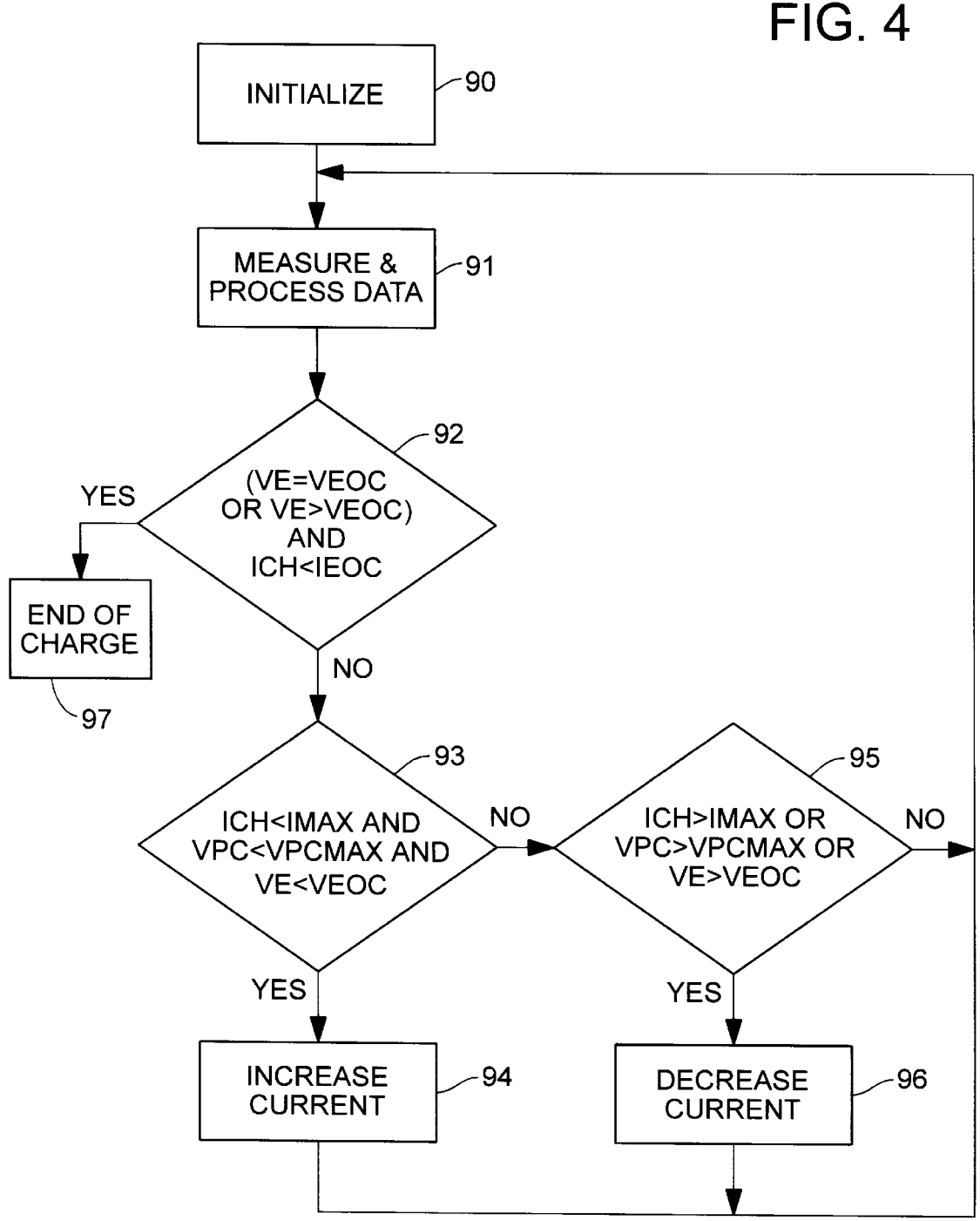
FIG. 4 is a flow chart illustrating a charging process according to various aspects of the present invention.

FIG. 4 shows a method for charging a rechargeable battery according to another embodiment of the present invention where $V_{CH}$ and $V_{CHMAX}$ of FIG. 3 are replaced by a protection circuit voltage $V_{PC}$ and a maximum protection circuit voltage $V_{PCMAX}$. The charging voltage control mode is replaced by a protection circuit voltage control mode until $V_E$ reaches $V_{EOC}$. FIG. 4 shows that the value of $V_{PCMAX}$ is set below the threshold voltage but higher than the end-of-charge voltage $V_{EOC}$. This allows a higher charging current (and, consequently, a higher charging power) during the protection circuit voltage control mode when compared to a conventional charging process in which the charging voltage is generally not allowed to be higher than the end-of-charge voltage $V_{EOC}$. Steps 90–97 of FIG. 4 correspond to steps 80–87 of FIG. 3 as discussed above.

Figure 5:
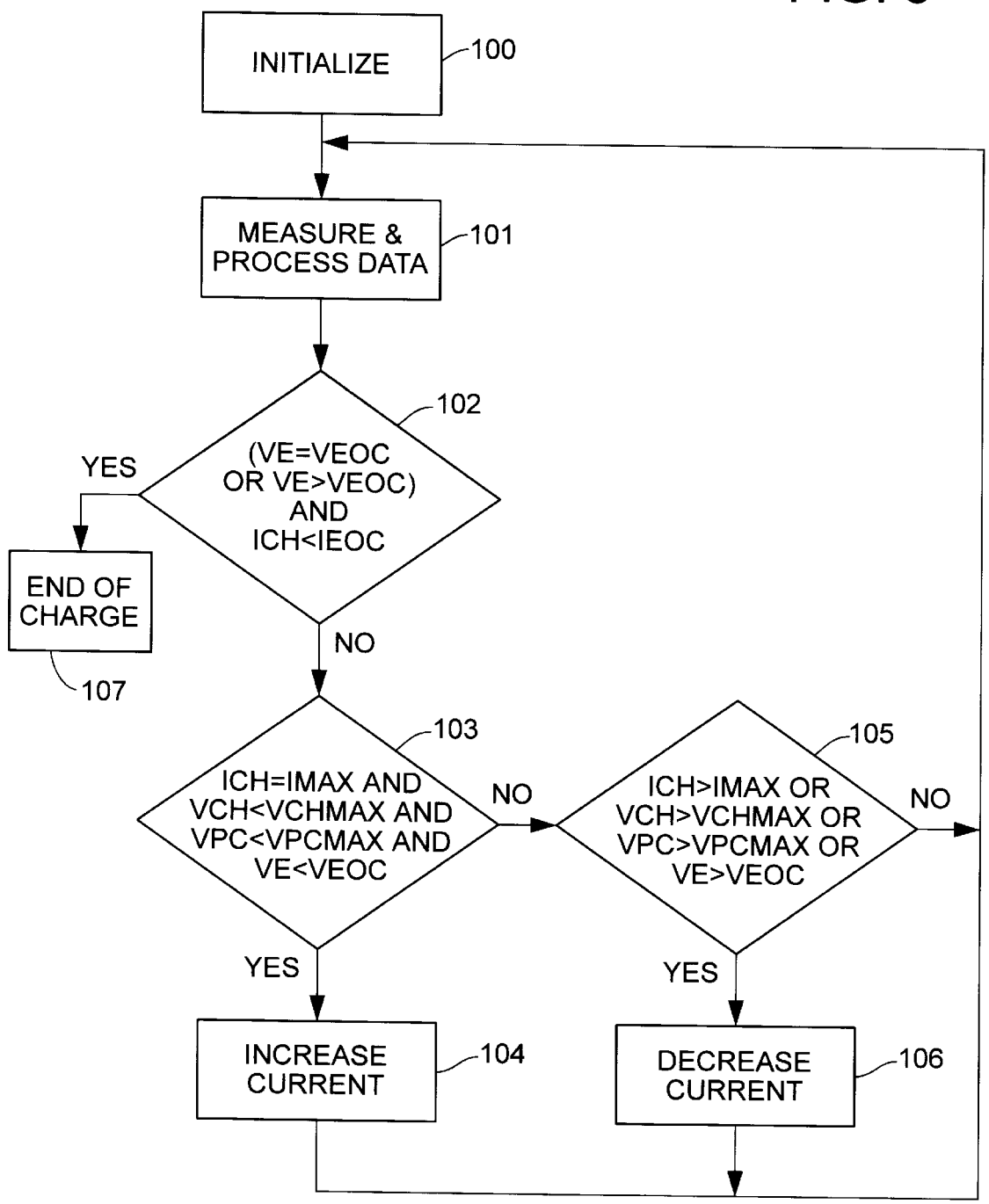
FIG. 5 is a flow chart illustrating a charging process according to various aspects of the present invention.

FIG. 5 shows a method for charging a rechargeable battery according to another embodiment of the present invention which combines charging processes of FIGS. 3 and 4. Steps 100–107 of FIG. 5 correspond to steps 80–87 of FIG. 3 as discussed above. Process step 101 includes measurement of data (including protection circuit voltage $V_{PC}$). Decision steps 103 and 105 include a comparison of $V_{PC}$ with the maximum allowed protection circuit voltage $V_{PCMAX}$. It is preferred that the values of $V_{CHMAX}$ and $V_{PCMAX}$ be determined such that $V_{CHMAX}$ is reached before $V_{PCMAX}$. When $V_{CHMAX}$ is reached, the charging current is reduced (leading to a decreased terminal voltage drop) while the open circuit voltage is increased (leading to an increase in the protection circuit voltage). When charging in a constant charging voltage control mode, the value of $V_{PC}$ increases until $V_{PCMAX}$ is reached.

In the process of FIG. 5, $V_{CHMAX}$ is included as a safety limit voltage. The use of $V_{PCMAX}$ ensures that the protection circuit is not triggered, but high ohmic resistances or poor connections may introduce high voltage drops and a corresponding high power loss at the terminals. In order to reduce such power loss, which could damage the terminals, $V_{CH-MAX}$ may be determined and the charging voltage control mode included in the charging process.

According to the charging process of FIG. 5, the charging power is first increased by performing steps 101, 102, 103, and 104 as a loop until $I_{MAX}$ is reached. Then, the process enters a constant charging current control mode until $V_{CH}$ reaches $V_{CHMAX}$. At this point, the charging process enters the constant charging voltage control mode which continues until $V_{PC}$ reaches $V_{PCMAX}$. Then, the charging current is further decreased to follow a constant protection circuit voltage control mode which is followed until $V_E$ reaches $V_{ECO}$. Finally, the charging current is decreased further to follow the electrode voltage control mode until $I_{CH}$ reaches $I_{EOC}$ at step 102. At step 107 the charging process is terminated.

For the charging processes of FIGS. 3–5, the charging parameters needed for controlling the charging process $I_{CH}$, $V_{CH}$, $V_{PC}$ and/or $V_E$ may be measured at regular time intervals. The duration of such time intervals may be 32 milliseconds, but much longer time intervals may suitably be used in accordance with the present invention. Time intervals up to several seconds may be used, depending on the technique used for measuring the charging parameters. Each parameter may be measured within a time frame much shorter than 32 milliseconds. Such a time frame may be 0.1–1 milliseconds, for example, but time frames of a longer duration may suitably be used, as long as the total time occupied by the total number of time frames does not exceed the measurement time interval.

In the process of FIG. 3, the charging current $I_{CH}$ may be measured within a time frame of about 0.1 milliseconds followed by a time frame of 0.1 milliseconds for measuring $V_{CH}$. This second time frame may be followed by a time frame of 0.1 milliseconds in which switch 49 is open for measuring $V_E$. In the process of FIG. 4, the measurement of $V_{CH}$ is replaced by a measurement of $V_{PC}$. Here, a longer time frame for measuring $V_{PC}$ may be desired to read the voltage via communication line 15, shown in FIG. 1. However, $V_{PC}$ may also be measured directly by use of an A/D converter, allowing a faster measurement. In the process of FIG. 5, measurement time slots may be included for both $V_{CH}$ and $V_{PC}$.

Figure 6:
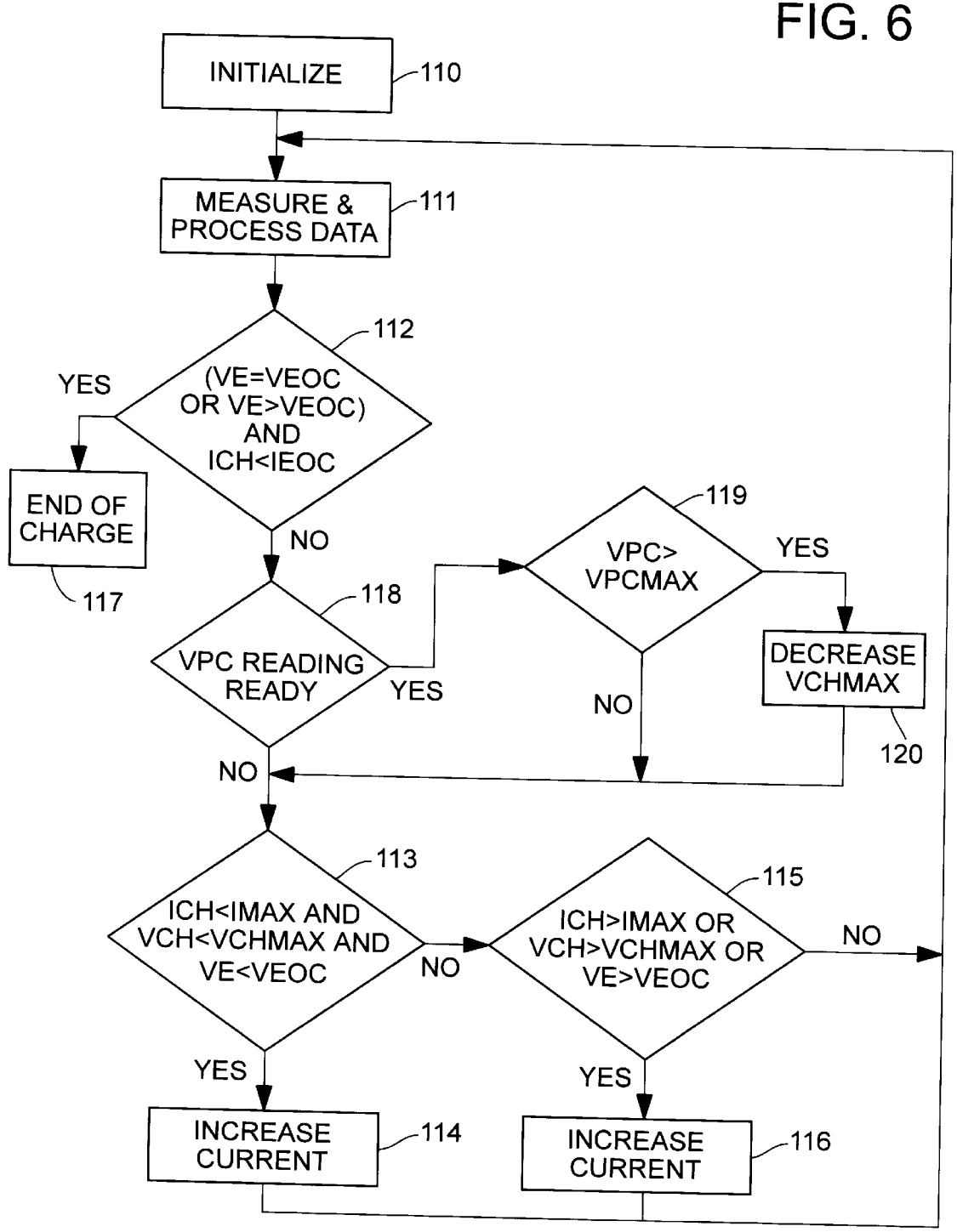
FIG. 6 is a flow chart illustrating a charging process according to various aspects of the present invention.

FIG. 6 shows a flow chart of a charging process similar to the charging process of FIG. 5. In the process of FIG. 6, however, the reading or measuring of the protection circuit voltage $V_{PC}$ is performed at time intervals different from the time intervals between measurements of $I_{CH}$, $V_{CH}$, and $V_E$, which are measured at time intervals as described with reference to FIG. 3. Thus, the time intervals between readings of $V_{PC}$ in FIG. 6 may be anything higher than the time intervals of FIG. 3, up to several seconds. In an embodiment of the present invention the reading of $V_{PC}$ is performed at time intervals of 30 seconds.

Steps 110–117 of FIG. 6 correspond to steps 80–87 of FIG. 3 as discussed above. Additional steps 118–120 are included for reading the protection circuit voltage and determining $V_{CHMAX}$ accordingly. The values of $V_{CHMAX}$ and $V_{PCMAX}$ are determined in accordance with the discussion of FIG. 5. When charging a fully discharged battery, $V_{CHMAX}$ may typically be reached before $V_{PCMAX}$ is reached.

In the charging process of FIG. 6, the charging current is increased until $I_{MAX}$ is reached. The charging process then proceeds in a constant current charging mode until $V_{CH}$ reaches $V_{CHMAX}$. At this point, the charging process enters the constant charging voltage control mode. At decision step 118 it is determined if a $V_{PC}$ reading is ready. If not, the normal charging process proceeds at step 113. If a $V_{PC}$ reading is ready, it is determined at decision step 119 whether $V_{PC}$ has reached $V_{PCMAX}$ or not. If not, then process flow goes back to step 113. If $V_{PC}$ has reached $V_{PCMAX}$, then the value of $V_{CHMAX}$ is decreased at process step 120 before the process enters step 113. Once $V_{CHMAX}$ has decreased at step 120, step 113 leads to a decrease in charging current via steps 115 and 116. When $V_{PC}$ has reached $V_{PCMAX}$, the charging process enters a protection circuit voltage control mode. In this mode, the maximum charging voltage $V_{CHMAX}$ and, consequently, the charging voltage $V_{CH}$ are adjusted so as to maintain the protection circuit voltage at $V_{PCMAX}$ for part of the charging process.

In the charging process of FIG. 6, the protection circuit voltage control mode may be followed until $V_E$ reaches $V_{ECO}$. At this point, the charging current may be decreased further to follow the open circuit voltage control mode until $I_{CH}$ reaches $I_{EOC}$ at step 112, leading to termination of the charging process at step 117.

Figure 7:
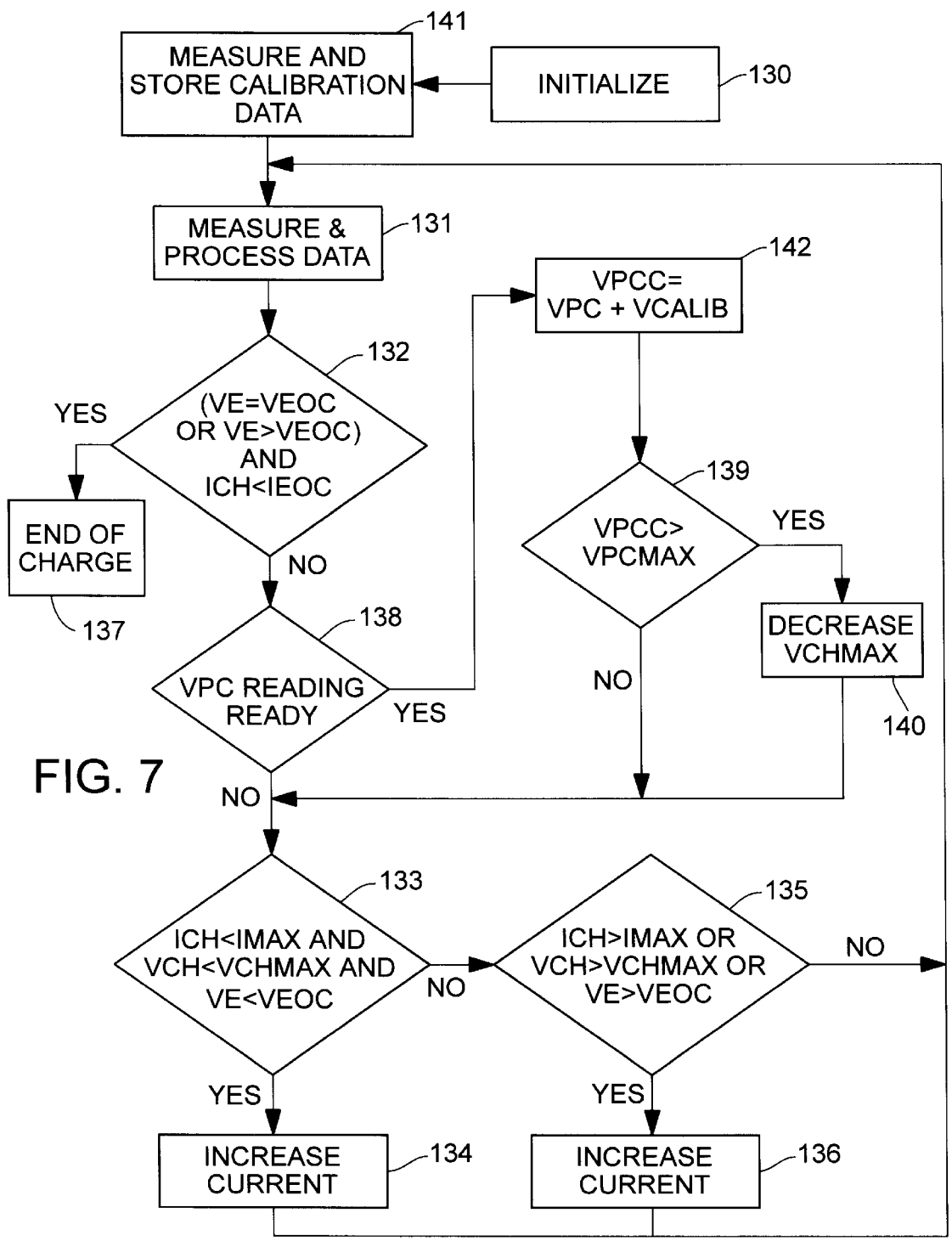
FIG. 7 is a flow chart illustrating a charging process according to various aspects of the present invention.

If desired, the reading of the protection circuit voltage may be calibrated. FIG. 7 shows a charging process corresponding to the charging process of FIG. 6, further including steps of calibration 141 and correction 142. In FIG. 7, steps 130–140 correspond to steps 110–120 of FIG. 6 as discussed above. In FIG. 7, the step of initialization 130 is followed by a calibration step 141 in which a calibration or correction value, $V_{CALIB}$ is determined (as discussed with reference to FIG. 8 below) and stored before the charging loop is entered at step 131. When a reading of $V_{PC}$ is ready at decision step 138, the stored correction value, $V_{CALIB}$, is added to $V_{PC}$ in order to obtain a corrected protection circuit voltage $V_{PCC}$ at process step 142. The determined value of $V_{PCC}$ is compared to $V_{PCMAX}$ at decision step 139 in order to determine whether $V_{CHMAX}$ should be decreased or not.

In the process of FIG. 7, the constant protection circuit voltage mode is controlled so as to maintain the corrected protection circuit voltage $V_{PCC}$ at $V_{PCMAX}$ during part of the charging process. When decreasing $V_{CHMAX}$ at step 140, it is preferred that the new value of $V_{CHMAX}$ is determined as the old value of $V_{CHMAX}$ minus the difference between $V_{PCC}$ and $V_{PCMAX}$.

Figure 8:
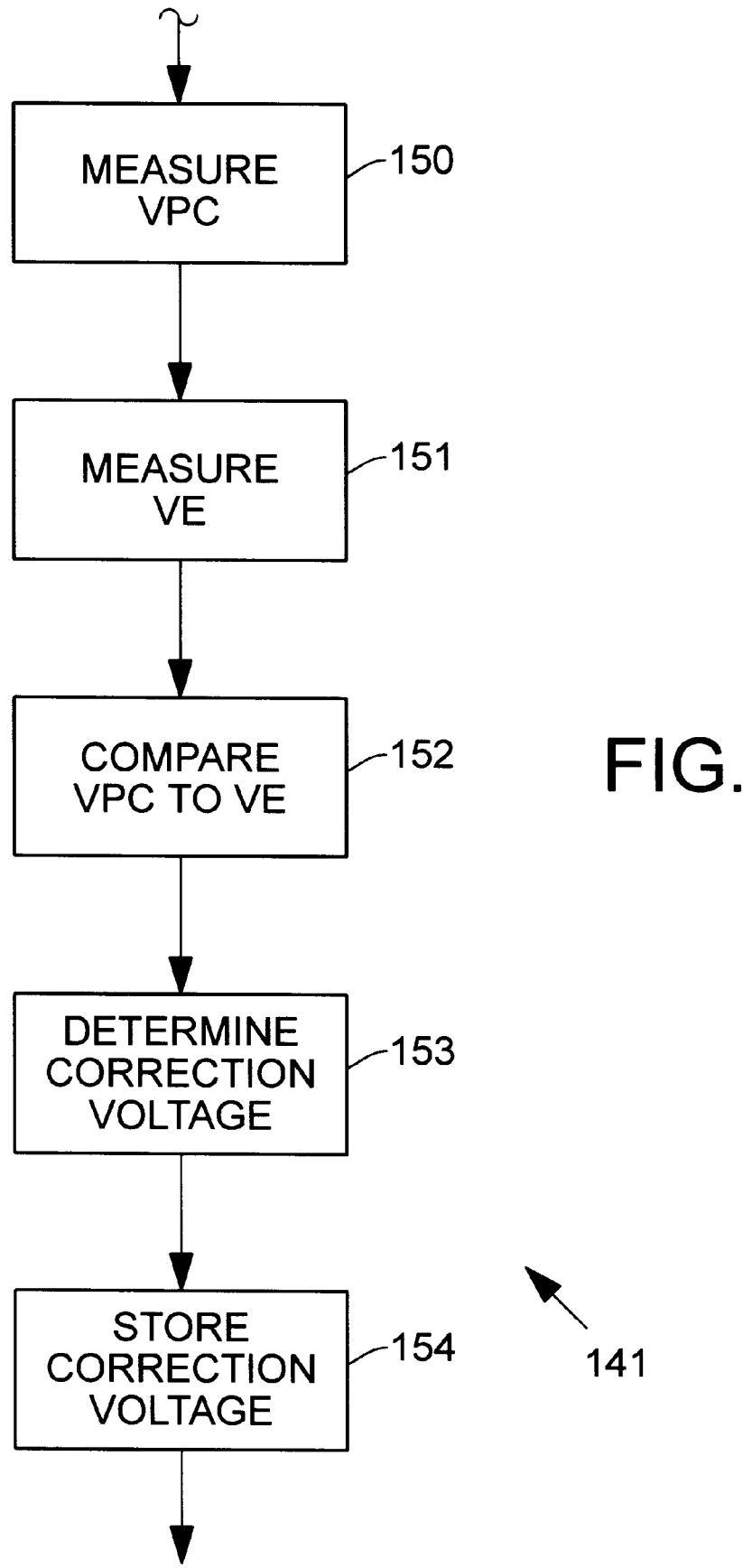
FIG. 8 is a flow chart illustrating a calibration process according to various aspects of the present invention.

Calibration step 141 of the process of FIG. 7 is shown in greater detail in FIG. 8. Calibration step 141 includes a step 150 for measuring and/or reading the protection circuit voltage $V_{PC}$, corresponding to determining the voltage output of the protection circuit. This is followed by process step 151 in which the electrode voltage (i.e., the at least substantially resistance-free voltage) $V_E$ is measured. At step 152 the obtained values of $V_{PC}$ and $V_E$ are compared to determine the voltage difference between them. At step 153 the resulting voltage correction value, $V_{CALIB}$, is determined based on the obtained voltage difference at step 152 and a predetermined voltage drop across the battery pack protection diode. If no protection diode is present, the voltage correction value equals the result of step 152. Finally, at step 154, the correction voltage $V_{CALIB}$ is stored for further use during the charging process.

Figure 9:
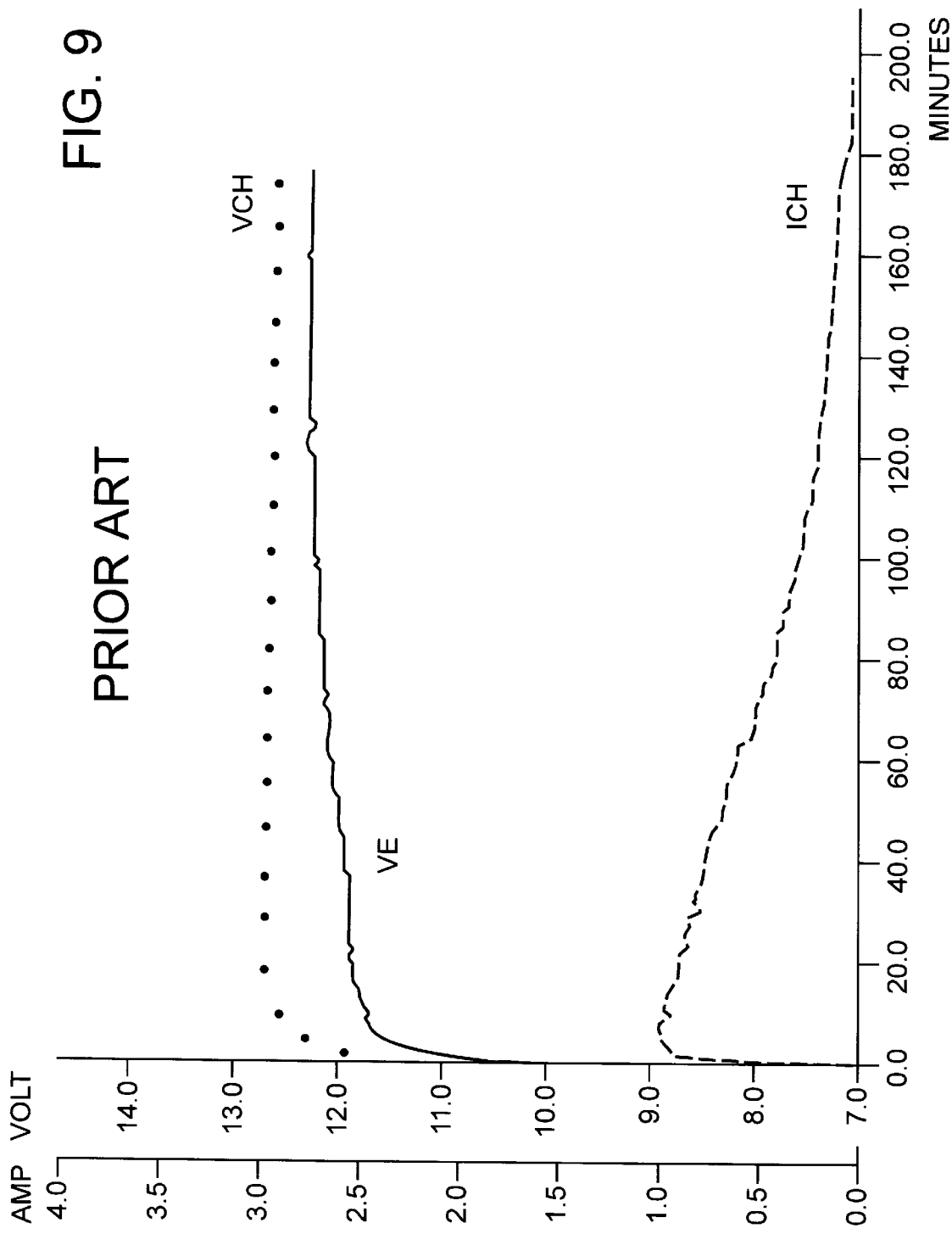
FIG. 9 illustrates a known charging process.
Figure 10:
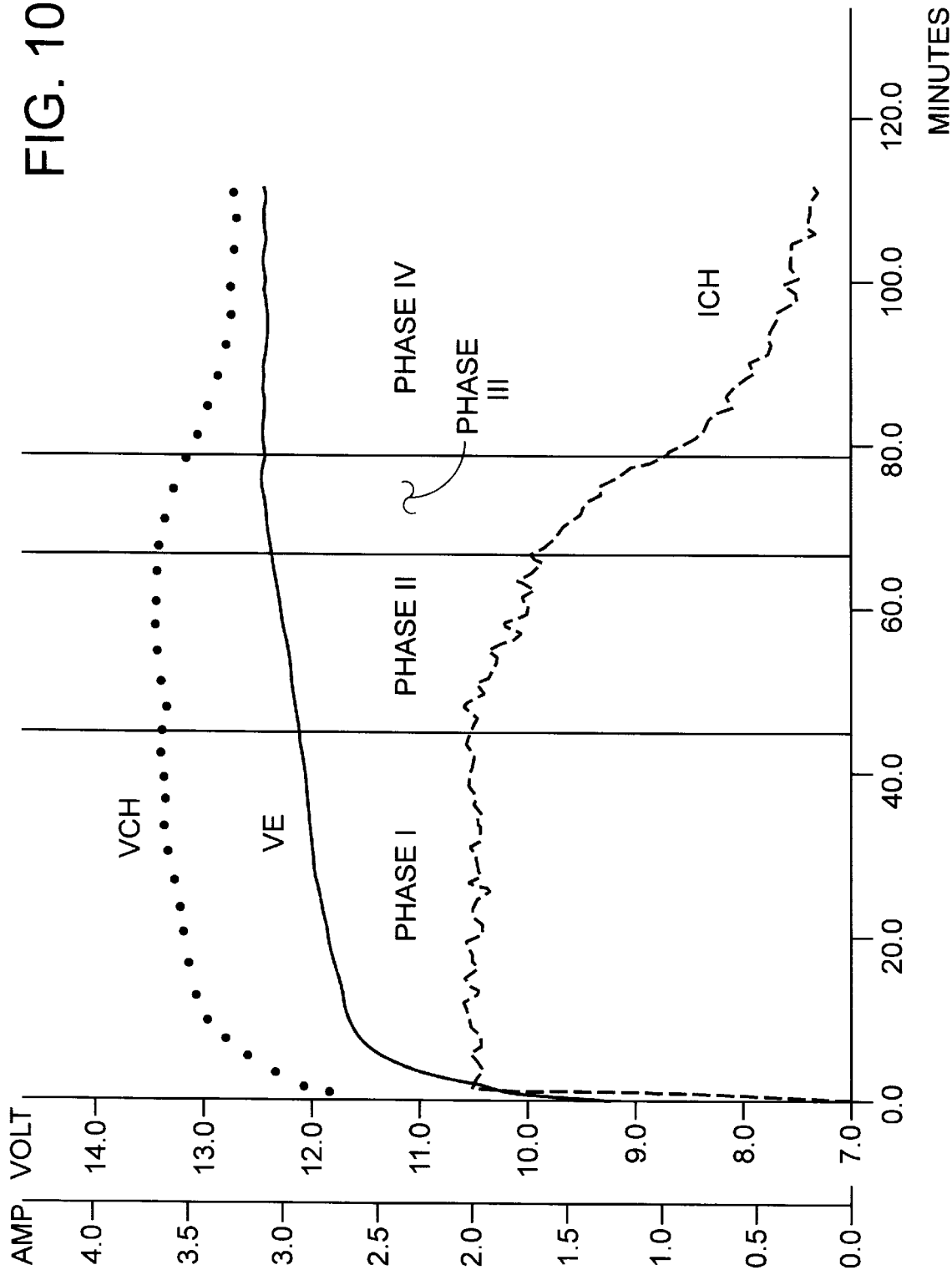
FIG. 10 illustrates a high current charging process according to various aspects of the present invention.

To further illustrate the various advantages and aspects of the present invention, a known charging process will now be described along with an embodiment of the invention. FIG. 9 is a graph of charging voltage and charging current during a known charging process. The battery used in the process of FIG. 9 is a fully discharged 1300 mAh lithium-ion battery with three cells and an end-of-charge voltage $V_{ECO}$ of 12.3 V. The battery pack includes a protection diode. In FIGS. 9 and 10, the dotted waveform represents the measured charging voltage $V_{CH}$, the solid waveform represents the measured open circuit voltage indicative of the electrode voltage $V_E$, and the dashed waveform represents the measured charging current $I_{CH}$. The measured open circuit voltage is corrected for the voltage drop of the protection circuit and the diode to determine the electrode voltage. The open circuit voltage is measured while applying a very small amount of current to the battery to forward bias the diode.

The known charging process of FIG. 9 include a constant current mode with a maximum charging current $I_{MAX}$ of 1 A, followed by a constant charging voltage mode having a maximum charging voltage $V_{CHMAX}$ of 12.66 V, the diode voltage drop being taken into account as about 300 mV. The charging process is terminated in the constant charging voltage mode when the charging current has decreased to about 60 mA. Within about 15 minutes from the start of the charging process of FIG. 9, the charging voltage reaches about 12.66 V. As a result, the constant current mode is very short. It ends after only about 15 minutes of charging, at which point in time the constant charging voltage mode is entered. Thus, in order to maintain the constant charging voltage, the charging current is decreased at an early stage of the charging process, resulting in a rather long charging time of about 190 minutes. When following the known charging process illustrated in FIG. 9, for batteries having larger capacity than 1300 mAh, the charging time will be much longer.

The battery pack used in the known process of FIG. 9 includes a protection circuit having a threshold voltage of 12.6 V. From the curves of FIG. 9 it is seen that $V_{CHMAX}$ (e.g. 12.66 V) has been set so low when the diode voltage drop is taken into account that the protection circuit voltage never reaches its threshold voltage of 12.6 V.

FIG. 10 is a graph of charging voltage and charging current during an example of a charging process in accordance with FIG. 7. In this example, battery 10 is a fully discharged 2600 mAh lithium-ion battery with three cells, having an end-of-charge voltage ($V_{ECO}$) of 12.3 V. Battery pack 10 includes a protection diode 13, protection circuit 60, and a voltage detection circuit 70 for measuring the protection circuit voltage. Voltage detection circuit 70 is initially calibrated. The process of calibration conventionally involves comparing a measurement to a standard. As used herein, the term "calibration" includes taking an uncompensated measurement from circuit 70 during a condition where compensation is not required, and using this measurement as the standard. This standard is then used when compensating for the internal voltage drop of battery 11 under high current. After storing calibration data, the charging process enters the constant current charging mode, Phase I of FIG. 10. The maximum charging current $I_{MAX}$ is set to 2 A. During the charging process, the values of $I_{CH}$, $V_{CH}$, $V_E$, and $V_{PC}$ are determined. The maximum charging voltage $V_{CHMAX}$ is set to 13.41 V. This value may be determined by test charging the battery at 2 A until the protection circuit 60 interrupts the charging process. The resulting $V_{CHMAX}$ is then set to a lower value. By using a high value of $V_{CHMAX}$, the 2 A charging current may be supplied for a long time period (up to about 47 minutes in this example). When the charging voltage reaches $V_{CHMAX}$, (at time=47 minutes), the charging process enters the charging voltage control mode, Phase II of FIG. 10.

In Phase II, the measured electrode voltage (i.e. the open circuit voltage) is not permitted to exceed 12.48 V. This voltage corresponds to an end-of-charge voltage $V_{ECO}$ of 12.3 V, when adjusted for the protection diode voltage drop of about 200 mV. The value of the maximum allowed protection circuit voltage $V_{PCMAX}$ is set at 12.43 V. During Phase II, the charging current is decreased in order to maintain a constant charging voltage. As a result of battery 11 accepting a charge, $V_E$ increases. When the corrected protection circuit voltage $V_{PCC}$ reaches $V_{PCMAX}$ (at time=67 minutes), the charging process enters the constant protection circuit voltage control mode, Phase III of FIG. 10.

In Phase III, the output of power supply 46 (FIG. 1) is controlled so as to reduce both the charging current and the charging voltage to maintain the protection circuit voltage at $V_{PCMAX}$.

When the measured electrode voltage $V_E$ reaches the point where the actual electrode voltage is at the end-of-charge voltage, (at time=76 minutes), the charging process enters the electrode voltage control mode, Phase IV of FIG. 10.

Phase IV of the charging process proceeds until the charging current has decreased to the predetermined end-of-charge current $I_{EOC}$ of 120 mA, at which point in time the charging process is finally terminated.

From FIG. 10 it is seen that the total charging time is about 113 minutes which is very much shorter than what could be obtained by the prior art technique of FIG. 9. At the termination of the charging process of FIG. 10, there is a difference of about 240–300 mV between $V_{CH}$ and $V_E$. This difference is due to the voltage drops of the loss resistances discussed above and the voltage drop of diode 13.

A charging process according to aspects of the present invention may also include one or more steps of determining and/or reading the battery temperature. By determining the battery temperature, which may be suitably measured, for example, by circuit 70 within battery pack 10 and transferred to microcontroller circuit 45, the charging process may be stopped if the battery temperature exceeds a predetermined limit. Such a limit may be in the range 45° to 50° C. Microcontroller circuit 45° C. may also be adapted so as not to start the charging process when battery temperature is low, for example, below 0° C. For such low temperatures, charger 40 may be adapted to supply a low trickle charge current, for example 50 mA, until battery temperature reaches a minimum for charging.

Figure 11:
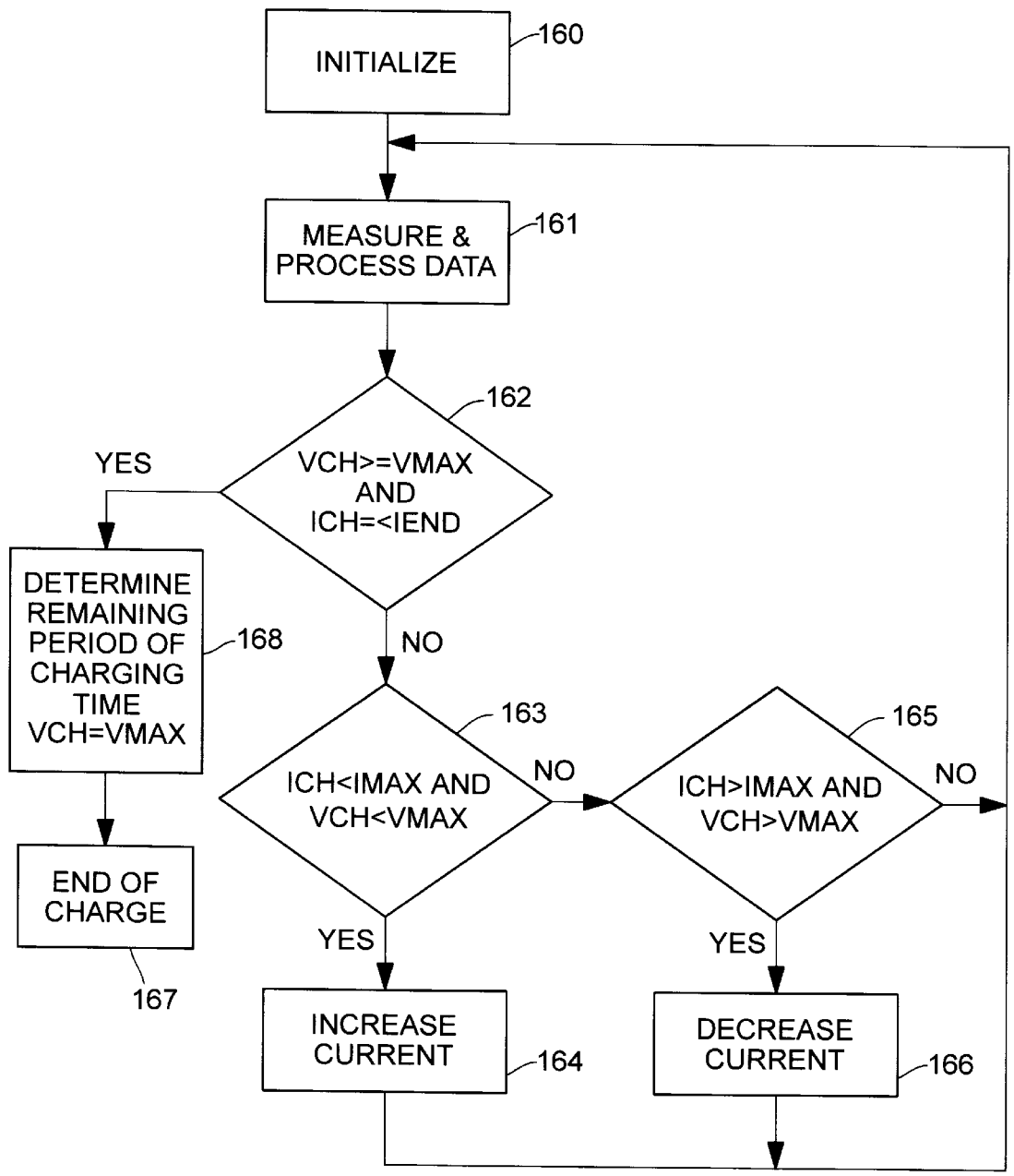
FIG. 11 is a flow chart illustrating a charging process according to various aspects of the invention.

FIG. 11 shows a charging process in which the charging voltage $V_{CH}$ and charging current $I_{CH}$ are measured. The charging process of FIG. 11 may be performed using a battery charger as illustrated in FIG. 1. However, since the charging process of FIG. 11 only requires measurement of the charging voltage $V_{CH}$ and the charging current $I_{CH}$, this process has no need for battery supervisor circuit 20, communication interface 45B, and communication line 53. Furthermore, the relevant predetermined charging parameters may be stored in microcontroller 45. These parameters may comprise the maximum charging current $I_{MAX}$, the maximum charging voltage $V_{MAX}$ (which preferably should equal the end-of-charge voltage $V_{ECO}$ or be a function of $V_{ECO}$), one or more remaining periods of charging time, and the current value $I_{END}$, which is the value to which the charging current should be decreased before determining a remaining period of charging time.

In the process of FIG. 11, the stored remaining periods of charging time may be determined from test charging the battery in a charging process, where the battery is charged in a constant current mode followed by a constant voltage mode until the charging current has decreased to an end of charge current $I_{EOC}$ of 5–10% of the maximum current in the constant current charging mode. The period of time between $I_{END}$ being reached and $I_{EOC}$ being reached may then be determined as the remaining period of charging time.

The flow chart of FIG. 11 starts at an initial step 160 and proceeds to process step 161. At step 160, battery pack 10 is connected to charger 40 and microcontroller 45 is initialized. If charger 40 is to be used for different battery types and/or sizes, battery pack 10 may include a circuit for communicating battery information via communication interface line 53 to microcontroller 45. In such a case, microcontroller 45 may also read a battery identifier from battery pack 10 at step 160. The identifier may be used as a reference for addressing battery specific predetermined charging parameters stored in microcontroller 45. However, these parameters need not be stored within charger 40 or controller 45. The parameters may also be pre-stored in battery pack 10 and communicated to microcontroller 45.

After initiation at step 160, the charging process proceeds to step 161. Here, the charging process is started with a low charging current, and is controlled based on measured values of the charging current $I_{CH}$ and the charging voltage $V_{CH}$. At step 161, data are measured and processed in order to determine the present values of $I_{CH}$ and $V_{CH}$. At the beginning of the charging process, the charging voltage $V_{CH}$ is below $V_{MAX}$, and the answer at decision step 162 is "no," leading to decision step 163. Again, at the beginning of the charging process $I_{CH} < I_{MAX}$, $V_{CH} < V_{MAX}$, and the answer to step 163 is "yes," leading to process step 164. At step 164, the charging current is increased. The current may be increased by increasing the duty cycle of PWM signal 50.

During the first phase of the charging process of FIG. 11, the loop follows steps 161, 162, 163 and 164. The charging power is increased until $I_{CH}$ reaches $I_{MAX}$ at which point step 163 leads to decision step 165. If $V_{CH}$ has not yet reached its limit, $V_{MAX}$, the output of step 165 is "no," and the charging power is maintained by following loop 161, 162, 163 and 165. However, if $I_{CH}$ is measured to be larger than $I_{MAX}$, the charging current is decreased at process step 166 by decreasing the duty cycle of PWM signal 50. When $I_{CH}$ reaches $I_{MAX}$, the charging process is controlled so as to charge in a constant charging current mode until $V_{CH}$ reaches its limit, $V_{MAX}$.

When $V_{CH}$ reaches $V_{MAX}$ the loop goes from step 163 to steps 165 and 166 to decrease the charging current. At this point, the charging process enters a constant charging voltage mode in which $V_{CH}$ is held substantially constant while the charging current $I_{CH}$ is reduced. This corresponds to the loop of steps 161, 162, 163, 165 and 166, or, for periods where there is no need for decreasing the current, the loop of steps 161, 162, 163 and 165.

When the charging current $I_{CH}$ has decreased to $I_{END}$, the answer to decision step 162 is "yes," and the charging process enters process step 168. At step 168 the remaining period of charging time corresponding to the value of $I_{END}$ is determined, and the charging process proceeds in the constant charging voltage mode for this determined period until the end of charge, at step 167. Other charging processes may be obtained by having $I_{EOC}$ replaced by $I_{END}$ and a process step corresponding to step 168 inserted before "end of charge" step 167.

A charging process may also include steps of determining and/or reading the battery temperature. The battery temperature may be measured by circuit 70 within battery pack 10 and transferred to microcontroller 45 of battery charger 40. The charging process may be stopped if the battery temperature exceeds a predetermined limit, for example above 45° C. or above 50° C. Microcontroller 45 may also be adapted so as not to start the charging process at low battery temperatures, for example below 0° C. At such low temperatures the charger may be adapted to supply a low trickle charge current of, for example 50 mA.

Figure 12:
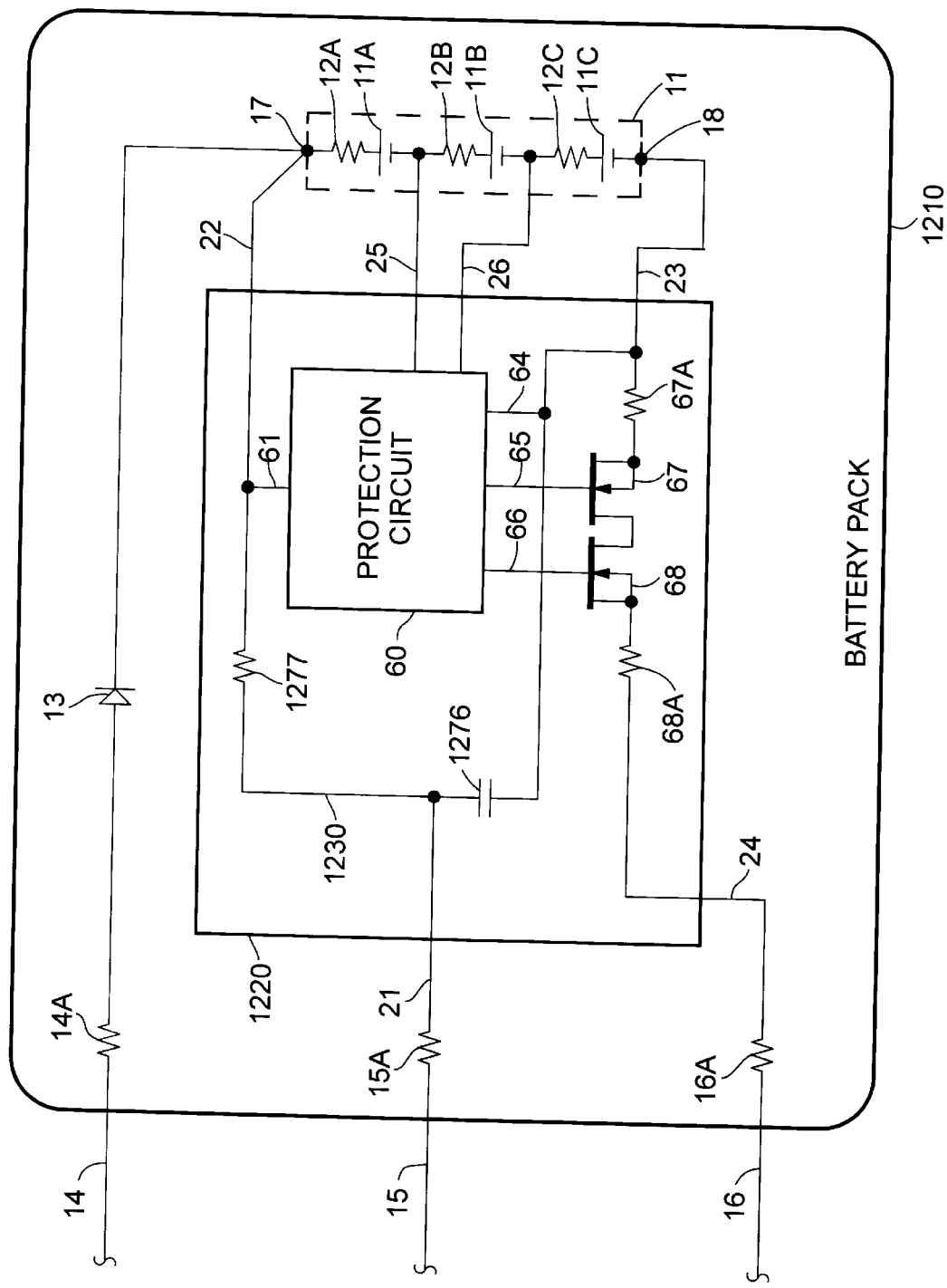
FIG. 12 is a circuit diagram showing various aspects of a battery pack charged according to the present invention.
Figure 13:
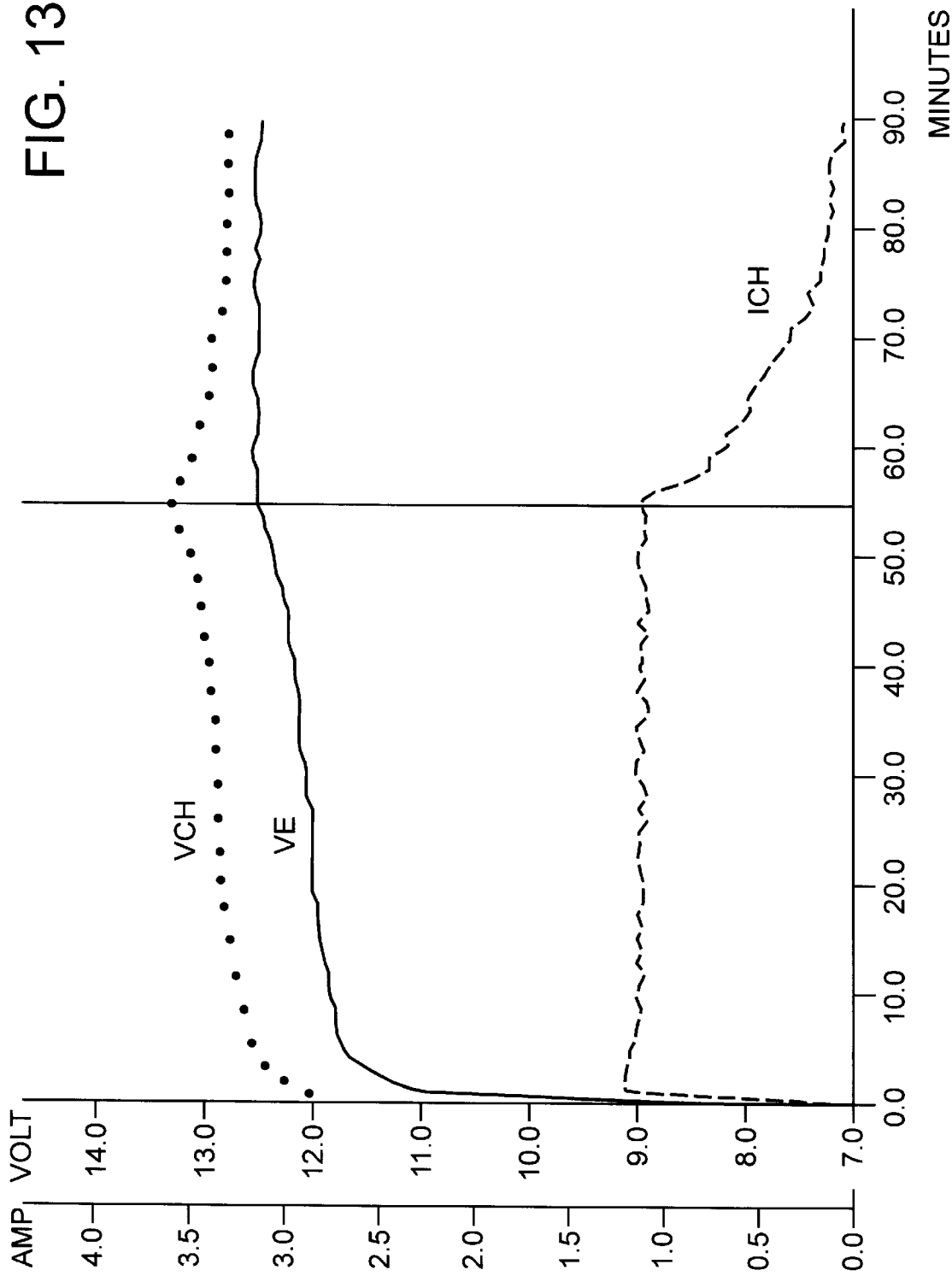
FIG. 13 illustrates a charging process that maintains charging current in accordance with a first parameter and then maintains charging voltage in accordance with a second parameter.

Another battery pack 1210 having a supervisor 20 is illustrated in FIG. 12. Supervisor 1220 of FIG. 12 is more simple than Supervisor 20 of FIG. 2. Supervisor 1220 does not include voltage detection 70, which is used in supervisor 20 for measuring the protection circuit voltage, or Current sense resistor 74. Instead, supervisor 1220 comprises a simple RC stage having a resistor 1277 and a capacitor 1276. Preferably, resistor 1277 and capacitor 1276 are directly connected across the cell(s) 11A, 11B and/or 11C. In such a configuration, the voltage across capacitor 1276 substantially equals the voltage across battery 11 or cells 11A, 11B and/or 11C. The other components of battery pack 1210 (FIG. 12) correspond to the components of battery pack 10 (FIG. 2).

The values of resistor 1277 and capacitor 1276 are preferably set so high that the voltage at node 21 is not changed significantly in periods where the charging current may be cut off in order to measure VE. By measuring the voltage at node 21, the voltage across battery terminals 17, 18 corresponding to the protection circuit voltage may be determined. The voltage at node 21 may be measured via line 15 during measurement periods in which the charging current is interrupted. During such a measurement period, the voltage at node 21 may correspond to the protection circuit voltage during periods of non-interrupted supply of charging current. In a variation of charger 40 for use with battery pack 1210, communication interface 45B is omitted and line 53 is input to A/D converter 45A. Alternatively, line 53 may be input to signal conditioning circuitry 55, from which an additional conditioned signal (not shown) is input to A/D converter 45B.

In an alternative battery pack where terminal 15 is omitted, the voltage at node 21 may be sensed by charger 40 via battery pack terminal 14. Such an alternative battery pack includes a circuit that senses interruption of charging current and couples node 21 to terminal 14 when charging current is interrupted.

In an alternative battery pack, RC circuit 1230 is omitted, and battery pack terminal 15 is directly connected to battery terminal 17, the positive side of battery 11. In such a variation, the voltage of battery 11 or, consequently, the protection circuit voltage, may be measured across battery terminals 15 and 16. In still another variation, an additional battery terminal (not shown) may be directly connected to battery terminal 18, the negative side of battery 11, to eliminate the effect of protection circuit switches 67 and 68 on measurements of the voltage of battery 11.

A method of the present invention charges a rechargeable (i.e. secondary) battery connected to a protection circuit that interrupts the charging process if the voltage applied to the battery reaches a predetermined threshold voltage. Accordingly, the charging process may be controlled in an optimum way so that the voltage sensed by the protection circuit maintains a value below the threshold value, thereby allowing a high charging rate without having the charging process interrupted by the protection circuit.

When the battery has a predetermined end-of-charge voltage, the method includes: (1) supplying a charging current to the battery, (2) determining or measuring a charging voltage corresponding to the battery terminal voltage when the charging current is supplied to the battery, and (3) charging the battery in a charging voltage control mode. The charging voltage may preferably be controlled with reference to the battery terminal voltage. Here, the charging current is supplied from an electrical power source or supply. When charging the battery in the charging voltage control mode, it is preferred that the output of the power supply is controlled so that the determined charging voltage does not exceed a predetermined level or value, referred to as a first protection voltage, or a maximum charging voltage. The charging voltage control mode controls the charging voltage so as to maintain the voltage monitored by the protection circuit above the end-of-charge voltage and below the threshold voltage of the protection circuit. Consequently, the protection circuit does not interrupt the charging process. Preferably, the battery terminal voltage is measured during periods of non-interrupted supply of the charging current.

When controlling the charging voltage with reference to the battery terminal voltage, the charging voltage can be understood as including an electrode voltage part and a terminal voltage drop part. The electrode voltage corresponds to the battery terminal voltage when no charging current is applied. The electrode voltage may be viewed as the battery voltage free of the internal resistance drop, also called the internal resistance free battery voltage. The terminal voltage drop is made up of all voltage drops (other than the electrode voltage) present when measuring the battery terminal voltage. The terminal voltage drop may include an internal voltage drop across the internal resistance of the battery, a voltage drop caused by the resistance of the protection circuit and/or voltage drops caused by other electronic components or circuits within the battery, such as a so-called gas gauge circuit or a protection diode arranged within the battery. The terminal voltage drop may also include a voltage drop across the resistance of each battery terminal, a voltage drop across each terminal or contact of a charger for charging the battery, and/or a voltage drop due to an internal resistance of the charger, including one or more current sense resistors. The terminal voltage drop is a function of the charging current supplied to the battery. Hence, for a high charging current, the terminal voltage drop will reach a high value when compared to the electrode voltage. For a low charging current, the terminal voltage drop will have a rather low value.

As discussed above, when charging a battery, e.g. a lithium type or lithium-ion type battery of a type having an end-of-charge voltage and a protection circuit having a threshold voltage, the battery voltage may increase during a first part of the charging process until the charging voltage reaches the end-of-charge voltage. At this point, the charging current may still have a rather high value compared to an end-of-charge current. Thus, the terminal voltage drop may have a high value and the electrode voltage may consequently be below the end-of-charge voltage. When the electrode voltage has not yet reached the end-of-charge voltage, a rapid charging process according to various aspects of the present invention, may be obtained by increasing the charging voltage above the end-of-charge voltage.

The charging voltage may be increased up to a maximum charging voltage. According to various aspects of the present invention, the maximum charging voltage may be determined so as to maintain the voltage monitored by the protection circuit below the threshold voltage but above the end-of-charge voltage. The charging process proceeds more rapidly when the voltage monitored by protection circuit is closer to the threshold voltage.

One way of determining a value for the maximum charging voltage is to perform a test by charging with a constant maximum charging current and allowing the charging voltage to increase above the end-of-charge voltage until the protection circuit interrupts the charging process. The charging voltage at the point of interruption is called the threshold charging voltage. The maximum charging voltage may be set a little lower in value than the threshold charging voltage. In so doing, the voltage monitored by the protection circuit is maintained below the threshold voltage. The maximum charging voltage may also be set to take into account a range of threshold voltages of different protection circuits.

When allowing the charging voltage to increase up to the maximum charging voltage, the electrode voltage increases and the charging current decreases. As the charging current decreases, the terminal voltage drop also decreases. If the charging current is further reduced, the charging voltage may be controlled so as to avoid having the voltage monitored by the protection circuit exceed the threshold voltage.

The maximum charging voltage may also be determined from calculations and/or measurements of various voltage drops included in the terminal voltage drop, with reference to expected values of the electrode voltage and the range of relevant charging currents. Such calculations may be functions of the threshold voltage, the voltage drop caused by the charging current in the internal resistance of the battery, the internal resistance of the protection circuit, the resistance of the battery terminals, the resistance of the charger terminals, and/or the resistance of one or more current sense resistors. The maximum charging voltage preferably has a value that avoids a high loss of energy in the ohmic resistance of the battery and the battery terminals.

The maximum charging voltage may be determined as a function of the end-of-charge voltage or as a function of the end-of-charge voltage, the charging current, and one or more series resistances. For example, the maximum charging voltage may be determined from the sum of and the end-of-charging voltage the voltage drop given by the charging current multiplied by one or more series resistances. Such resistances include that of any current sense resistors, the charger terminal resistance, the battery terminal resistance, and the internal cell resistance.

From experiments, it has been found that the maximum charging voltage should be in the range of 100–140% of the end-of-charge voltage, preferably in the range of 100–110% of the end-of-charge voltage. A 3-cell battery, for example, may have an end-of-charge voltage of about 4.1 V/cell, and a battery end-of-charge voltage of 12.3 V. The maximum charging voltage may be set to about 13.5 V. If the battery pack also has a protection diode, the voltage drop caused by this diode should be taken into account.

When the battery includes circuitry for determining or measuring the voltage monitored by the protection circuit, it is preferred to determine or measure, a so-called protection circuit voltage when charging current is being supplied to the battery, preferably without interruption. It is then preferred to charge the battery in a protection circuit voltage control mode based on the determined or measured protection circuit voltage. In this mode, the charging voltage is maintained so that the voltage monitored by the protection circuit above the end-of-charge voltage and below the threshold voltage.

The protection circuit voltage control mode includes maintaining the measured protection circuit voltage below a protection voltage. The protection voltage has a value above the end-of-charge voltage. The protection voltage is set so that the protection circuit does not interrupt charging, i.e. the voltage monitored by the protection circuit does not exceed the threshold voltage.

It is preferred that the protection circuit voltage is determined directly by measuring the voltage monitored by the protection circuit. However, the protection circuit voltage may also be determined otherwise. Here it is important that the determined protection circuit voltage corresponds to the voltage monitored by the protection circuit. This ensures that changes in the voltage monitored by the protection circuit result in corresponding changes in the determined protection circuit voltage.

When the protection circuit voltage is determined substantially directly, the protection voltage should preferably be set to a value close to the threshold voltage of the protection circuit. Again, a margin may also be provided to allow for a range of threshold voltages of different protection circuits. Such a margin also allows for inaccuracy when measuring the voltage actually monitored by the protection circuit. The protection circuit voltage may be determined as a function of the threshold voltage. The protection voltage may also be determined as a function of the internal resistance of the protection circuit. A lower limit of the protection voltage may be determined as a function of the voltage drop caused by the charging current flowing through the internal resistance of the battery.

In a variation, a value of the protection circuit voltage is stored in the battery pack. In such an embodiment, the battery pack contains an information storage device (e.g. an electronic memory) for storing the value of the protection voltage.

It is preferred that the electrode voltage is determined during at least part of the charging process, for example, during periods in which the supply of charging current is interrupted or reduced. In one embodiment of the invention, the battery is charged in the charging voltage control mode until the electrode voltage reaches the end-of-charge voltage of the battery.

If the battery pack includes a protection diode, it is necessary to have a small current flowing through this diode when measuring the electrode voltage. In this situation, the measured voltage will be the sum of the battery voltage (including the electrode voltage) and the voltage drop across the diode. When comparing the measured electrode voltage with the end-of-charge voltage, the measured electrode voltage may be corrected for this voltage drop, if such a diode is present in the battery pack.

In a preferred embodiment, the maximum protection circuit voltage may be set to a value close to the threshold voltage, whereas the maximum charging voltage may be chosen as an overall protection charging voltage. Thus, if the resistance of the terminals has a relatively high value (generating a high voltage drop when charging with a high current), part of the charging process may follow a charging voltage control mode so as not to let the charging voltage exceed the maximum charging voltage. This charging voltage control mode may be followed until the charging current and the consequent terminal voltage drop have dropped so much that the protection circuit voltage has increased to the maximum protection circuit voltage. At this stage the charging process may proceed in a protection circuit voltage control mode where the charging voltage is controlled with reference to maintaining the protection circuit voltage less than (or equal to) the maximum protection circuit voltage. The protection circuit voltage control mode may be followed until the electrode voltage reaches the end-of-charge voltage.

Such a charging process charges the battery in an electrode voltage control mode so as to maintain the electrode voltage substantially at the battery end-of-charge voltage. Here it is preferred that charging in the electrode voltage control mode is terminated when the charging current has decreased to a predetermined end-of-charge current. When charging is so terminated, the battery will have been charged to an almost fully charged state, i.e. further charging may not add much capacity to the battery. The end-of-charge current may be set at a rather low value such as, for example, 5–10% of the maximum charging current to help ensure that the battery is fully charged.

When charging the battery according to any of the methods described above, it is preferred to first charge the battery in a constant current charging mode until the charging voltage reaches the maximum charging voltage or the protection circuit voltage reaches the threshold voltage. As discussed above, the battery may be charged by a substantially constant current during the constant current charging mode.

For charging a rechargeable battery, the value of the charging current may be given as a relative measure compared to the capacity of the battery. Thus, if a battery is charged at a rate in Amperes equal to the capacity in Ampere-hours of the battery, the battery is charged with a so-called 1 C current (i.e. at a 1 C rate). According to the present invention, the current supplied during the constant current charging mode may be supplied at a rate greater than 0.3 C, preferably in the range of 0.5–5 C, and most preferably in the range 1–2 C.

When terminating the charging process, the end-of-charge current may be set in the range of 2–50% of the charging current supplied during the constant current charging mode, preferably in the range of 5–20% of this current.

A charger according to various aspects of the present variation preferably communicates with a voltage detection circuit in the battery pack that measures the voltage monitored by the protection circuit. The voltage detection circuit may be included with a commercially available "gas gauge" circuit. Alternatively, the voltage detection circuit may be part of the protection circuit in the battery pack. Preferably, the output of the voltage detection circuit is measured when charging current to the battery is interrupted or supplied at a reduced rate for detection of the electrode voltage. When charging in a protection circuit voltage control mode, the charging voltage may be controlled with reference to the electrode voltage and a voltage correction value.

To determine the voltage correction value, the battery voltage is determined both at the battery terminals and from the output of the voltage detection circuit. The voltage correction value is then computed by comparing these two voltages. Preferably, this determination is made while charging current is interrupted or substantially reduced.

The voltage window ranging from the end-of-charge voltage to the threshold voltage may be rather narrow. Consequently, it is important that the output of the voltage detection circuit provides sufficient accuracy. When a commercially available gas gauge circuit provides the voltage detection circuit, the output of the voltage detection circuit is preferably calibrated to improve accuracy. An initial charging phase may be used to calibrate the output of a voltage detection circuit. The result of the calibration is used to correct the output of the voltage detection circuit. The calibration phase preferably includes the following:
1. determining the output of the voltage detection circuit,
2. determining the battery terminal voltage,
3. comparing the determined battery terminal voltage with the determined output of the voltage detection circuit,
4. determining, based on the comparison, a voltage correction value for the voltage detection circuit, and
5. storing the voltage correction value. In a variation, the voltage correction value is stored in a "storage means" (i.e. an information storage device) in the battery pack.

When determining the battery terminal voltage and the voltage detection circuit output voltage during the calibration process, the supply of charging current to the battery is preferably interrupted (or supplied at a reduced rate) to allow the output voltage of the voltage detection circuit to closely represent the electrode voltage. This substantially removes resistive voltage drop between the battery voltage and the electrode voltage. For batteries having a protection diode, however, a voltage drop across this diode will still be present between the battery voltage and the electrode voltage. This voltage drop should be considered when determining the voltage correction value.

Any of the aforementioned embodiments of the present invention that determine the electrode voltage may also charge the battery in an electrode voltage control mode. This mode maintains the electrode voltage substantially at the battery end-of-charge voltage. Preferably, the charging apparatus is adapted to terminate charging in the electrode voltage control mode when the charging current has decreased to a predetermined low end-of-charge current.

Any of the embodiments of the invention which have been described above may be adapted to control the supply of the charging current in a constant current charging mode until the beginning of a charging voltage control mode. As described above, such charging voltage control modes indirectly control the supply of charging current by controlling charging voltage with reference to the maximum charging voltage or the voltage monitored by the protection circuit. In the constant current charging mode, the battery is charged by a substantially constant current. In this mode, the charger may control the supply of charging current at a rate (in Amperes) greater than 0.3 C, preferably in the range of 0.5–5 C, and most preferably in the range around 1–2 C.

The various embodiments of the present invention are useful for charging rechargeable batteries having a protection circuit, including lithium-based batteries. Such batteries may have several types of lithium chemistries, including lithium-ion, lithium solid state (LSS), and lithium polymer. The word "battery" in this context comprehends any assembly having one or more electrochemical cells. The various embodiments of the invention are also useful for charging batteries with other chemistries, including Zinc-Air and Zinc-Silver.

A charging process according to the present invention preferably includes a charging voltage control mode that controls the charging voltage with reference to either the protection circuit voltage or the open circuit voltage for at least part of the charging process. The remaining period of charging time is determined when such a reference voltage (or a voltage determined therefrom) reaches a predetermined value. This predetermined value may represent a maximum charging voltage, a maximum protection circuit voltage, or a maximum electrode voltage. Preferably, the charging voltage control mode does not allow the charging voltage, the protection circuit voltage, or the open circuit voltage to exceed its corresponding predetermined value.

To determine the remaining period of charging time, it is preferred to use an electronic memory that stores one or more periods of remaining charging time. These periods may begin when the charging voltage reaches or exceeds the maximum charging voltage, the protection circuit voltage reaches or exceeds the maximum protection circuit voltage, and/or the open circuit voltage reaches or exceeds the maximum open circuit voltage.

In a variation, the charging process is controlled so that the charging current is decreased in the charging voltage control mode, and the remaining period of charging time is determined as a function of the charging current or determined when the charging current has decreased to a predetermined current value. The charging process may also include a charging current control mode in which constant current is supplied before the charging voltage control mode is begun. The predetermined current value may then be determined as a function of the maximum charging current that was supplied in the charging current control mode. The predetermined current value may be set in the range of 10–90%, preferably in the range of 20–80%, and most preferably in the range of 30–70%, of the maximum charging current. A predetermined current value of 50%, for example, is in the most preferred range. When determining the remaining period of charging time as a function of the charging current it is preferred to make use of an electronic memory which stores one or more remaining periods of charging time corresponding to the charging current value(s).

In a variation, a battery charger includes a power supply for providing a charging current to the battery pack and a communication bus. An information receiver in the charger may receive the stored battery information via the communication bus. The charger may then control the power supply output based on the received charging parameters. Several charging parameters, such as a maximum charging voltage, a maximum charging current, a threshold voltage of the protection circuit, and an end-of-charge voltage may be stored in the battery charger or in the battery pack. Charging parameters for different batteries may be pre-stored in a memory of the battery charger and the relevant parameters may be selected by using a battery identifier or identification code read from the battery. However, when introducing new battery types to the market, such batteries might need charging parameters which were not available when charging parameters were stored in the memory of the battery charger. Thus, storing such parameters in the battery pack may be desired.

Preferably, the charging parameters represent predetermined maximum charging voltage levels. One of the charging parameters is preferably indicative of a voltage level higher than another voltage level indicated by another charging parameter.

The battery to be charged may have a predetermined end-of-charge voltage. For such a battery, one of two charging parameters may indicate the end-of-charge voltage. In one embodiment, the charger prevents the electrode voltage from exceeding the end-of-charge voltage. In this exemplary configuration, the higher of the two charging parameters indicates the threshold voltage of a protection circuit in the battery pack.

In an embodiment, the battery pack contains an information storage device for storing information such as the charging parameters. Such a device may be quite simple, for example comprising a resistor network with one or more resistors. In such a network, the value(s) of the resistor(s) may be read by the battery charger to transfer battery information stored in the battery pack to the charger. In another embodiment, the information storage device suitably includes an electronic memory, for a example non-volatile ROM, EEPROM, and/or EPROM. Preferably, the battery information is pre-stored in the electronic memory. Such an electronic memory may be part of supervisor circuit 20 or a part of a battery pack without a supervisor circuit. The battery information may also include a maximum charging current parameter and/or an end-of-charge current parameter. The maximum charging current parameter may be used for control of the charging process before entering one of the voltage control modes (e.g., charging voltage control mode, protection circuit voltage control mode, or electrode voltage control mode) described above. The end-of-charge current parameter may be used for terminating the charging process at the end of a voltage control mode.

The foregoing description of preferred exemplary embodiments of the invention is not intended to be exhaustive or to limit the invention to the precise form disclosed. Many modifications and variations will become apparent to those skilled in the art upon inspection of the specification and the drawings. All such modifications are intended to fall within the scope of the invention, as defined by the appended claims.

We claim:

1. A method of charging a rechargeable battery, the method comprising:
   (a) providing a battery pack comprising:
      (1) a plurality of terminals for accepting a charging current, a first voltage being developed across the terminals;
      (2) a rechargeable battery, coupled to the terminals, a second voltage being developed across the rechargeable battery, the rechargeable battery operating according to a model comprising:
         (A) an ideal battery, a third voltage being developed across the ideal battery, the third voltage reaching an end-of-charge voltage when the rechargeable battery is fully charged, and
         (B) an internal resistance, a voltage differential between the second voltage and the third voltage being developed across the internal resistance in proportion to the charging current; and
      (3) a protection circuit, coupled to the rechargeable battery, for causing charging current to be stopped whenever the second voltage reaches a threshold voltage; and
   (b) supplying charging current so as to maintain the second voltage to be above the end-of-charge voltage and to be below the threshold voltage during at least part of the charging process;
   whereby the rechargeable battery is charged without the protection circuit causing charging current to be stopped.

2. The method of claim 1 wherein the battery pack provides the value of the threshold voltage from an information storage device contained in the battery pack.

3. The method of claim 1 further comprising, before step (b), supplying charging current at a predetermined constant current rate.

4. The method of claim 3 wherein the constant current rate is about 1–2 times the constant current rate that would charge the rechargeable battery in one hour.

5. The method of claim 3 wherein the battery pack provides the value of the constant current rate from an information storage device contained in the battery pack.

6. The method of claim 1 further comprising supplying charging current to maintain the third voltage to be at or below the end-of-charge voltage.

7. The method of claim 6 wherein the battery pack provides the value of the end-of-charge voltage from an information storage device contained in the battery pack.

8. The method of claim 1 further comprising, after step (b), terminating charging when the charging current falls below a lower limit, the lower limit being in the range from about 5% to about 20% of the constant charging current.

9. The method of claim 1 further comprising a process for measuring the second voltage using a voltage detection circuit, the process comprising:
   (1) providing a voltage detection circuit for measuring the second voltage;
   (2) charging the rechargeable battery in an initial charging phase; and
   (3) calibrating the output of the voltage detection circuitry using the result of the calibration.

10. The method of claim 1 further comprising supplying charging current so as to maintain the first voltage to be at or below a maximum charging voltage.

11. The method of claim 10 wherein the maximum charging voltage is a function of:
   (1) the end-of-charge voltage;
   (2) the charging current; and
   (3) the internal resistance.

12. The method of claim 10 wherein the battery pack provides the value of the maximum charging voltage from an information storage device contained in the battery pack.

13. The method of claim 1 further comprising a process for measuring the third voltage, the process comprising:
   (1) repeatedly interrupting the supply of significant charging current;
   (2) while significant charging current is interrupted, measuring an open-circuit voltage across the terminals; and
   (3) resupplying charging current to the terminals to maintain the third voltage to be below the end-of-charge voltage.

14. The method of claim 1 wherein the rechargeable battery comprises a plurality of cells and the protection circuit is further coupled to a plurality of cells.

15. A method of charging a rechargeable battery, the method comprising, in sequence:
   (a) providing a battery pack comprising:
      (1) a plurality of terminals for accepting a charging current, a first voltage being developed across the terminals;

(2) a rechargeable battery, coupled to the terminals, a second voltage being developed across the rechargeable battery, the rechargeable battery operating according to a model comprising:
   (A) an ideal battery, a third voltage being developed across the ideal battery, the third voltage reaching an end-of-charge voltage when the rechargeable battery is fully charged, and
   (B) an internal resistance, a voltage differential between the second voltage and the third voltage being developed across the internal resistance in proportion to the charging current; and
(3) a protection circuit, coupled to the rechargeable battery, for causing charging current to be stopped whenever the second voltage reaches a threshold voltage;
(b) supplying charging current at a constant current rate of about 1–2 times the amount of current that would charge the rechargeable battery in one hour;
(c) supplying charging current so as to maintain the first voltage to be at or below a maximum charging voltage;
(d) supplying charging current so as to maintain the second voltage to be above the end-of-charge voltage and to be below the threshold voltage;
(e) supplying charging current to maintain the third voltage to be at or below the end-of-charge voltage; and
(f) terminating charging when the charging current falls below a lower limit, the lower limit being in the range from about 5% to about 20% of the constant charging current;
whereby the rechargeable battery is charged without the first voltage exceeding the maximum charging voltage, the second voltage exceeding the threshold voltage of the protection circuit, or the third voltage exceeding the end-of-charge voltage.

16. The method of claim 15 further comprising a process for measuring the second voltage using a voltage detection circuit, the process comprising:
(1) providing a voltage detection circuit for measuring the second voltage;
(2) charging the rechargeable battery in an initial charging phase; and
(3) calibrating the output of the voltage detection circuitry using the result of the calibration.

17. The method of claim 15 further comprising a process for measuring the third voltage, the process comprising:
(1) repeatedly interrupting the supply of significant charging current;
(2) while significant charging current is interrupted, measuring an open-circuit voltage across the terminals; and
(3) resupplying charging current to the terminals to maintain the third voltage to be below the end-of-charge voltage.

18. The method of claim 15 wherein the maximum charging voltage is a function of:
(1) the end-of-charge voltage;
(2) the charging current; and
(3) the internal resistance.

19. The method of claim 15 wherein the battery pack provides the values of a plurality of the maximum charging voltage, the constant current rate, the threshold voltage, and the end-of-charge voltage from an information storage device contained in the battery pack.

20. The method of claim 15 wherein the rechargeable battery comprises a plurality of cells and the protection circuit is further coupled to a plurality of cells.

21. A system for charging a rechargeable battery, the system comprising:
(a) a battery pack including:
   (1) a plurality of terminals for accepting a charging current, a first voltage being developed across the terminals;
   (2) a rechargeable battery, coupled to the terminals, a second voltage being developed across the rechargeable battery, the rechargeable battery operating according to a model comprising:
      (A) an ideal battery, a third voltage being developed across the ideal battery, the third voltage reaching an end-of-charge voltage when the rechargeable battery is fully charged, and
      (B) an internal resistance, a voltage differential between the second voltage and the third voltage being developed across the internal resistance in proportion to the charging current; and
   (3) a protection circuit, coupled to the rechargeable battery, for causing charging current to be stopped whenever the second voltage reaches a threshold voltage; and
(b) a charger for supplying charging current in a charging process, the charging process comprising maintaining the second voltage to be above the end-of-charge voltage and to be below the threshold voltage during at least part of the charging process;
whereby the charger charges the rechargeable battery without the protection circuit causing charging current to be stopped.

22. The system of claim 21 further comprising an information storage device in the battery pack for providing the value of the threshold voltage.

23. The system of claim 18 wherein the charging process further comprises, before step (b)(1), supplying charging current at a predetermined constant current rate.

24. The system of claim 23, wherein the charger supplies constant charging current at about 1–2 times the rate that would charge the rechargeable battery in one hour.

25. The system of claim 23 further comprising an information storage device in the battery pack for providing the value of the constant current rate.

26. The system of claim 21 wherein the charging process further comprises supplying charging current so as to maintain the first voltage to be at or below a maximum charging voltage.

27. The system of claim 26 further comprising an information storage device in the battery pack for providing the value of the maximum charging voltage to the charger.

28. The system of claim 21 wherein the charger determines the maximum charging voltage responsive to:
(1) the end-of-charge voltage;
(2) the charging current; and
(3) the internal resistance.

29. The system of claim 21 wherein the charging process further comprises supplying charging current to maintain the third voltage to be at or below the end-of-charge voltage.

30. The system of claim 29 further comprising an information storage device in the battery pack for providing the value of the end-of-charge voltage.

31. The system of claim 21 wherein the charging process further comprises terminating charging when the charging current falls below a lower limit, the lower limit being in the range from about 5% to about 20% of the constant charging current.

32. The system of claim 21 wherein the charging process further comprises a measuring process for measuring the third voltage, the measuring process comprising:

(1) repeatedly interrupting the supply of significant charging current;

(2) while significant charging current is interrupted, measuring an open-circuit voltage across the terminals; and (3) resupplying charging current to the terminals to maintain the third voltage to be below the end-of-charge voltage.

33. The system of claim 21 further comprising a voltage detection circuit for measuring the second voltage, the output of the voltage detection circuitry being calibrated by charging the rechargeable battery in an initial charging phase.

34. The system of claim 21 wherein the rechargeable battery comprises a plurality of cells and the protection circuit is further coupled to a plurality of cells.

35. A system for charging a rechargeable battery, the system comprising:
(a) a battery pack comprising:
  (1) a plurality of terminals for accepting a charging current, a first voltage being developed across the terminals;
  (2) a rechargeable battery, coupled to the terminals, a second voltage being developed across the rechargeable battery, the rechargeable battery operating according to a model comprising:
    (A) an ideal battery, a third voltage being developed across the ideal battery, the third voltage reaching an end-of-charge voltage when the rechargeable battery is fully charged, and
    (B) an internal resistance, a voltage differential between the second voltage and the third voltage being developed across the internal resistance in proportion to the charging current; and
  (3) a protection circuit, coupled to the rechargeable battery, for causing charging current to be stopped whenever the second voltage reaches a threshold voltage;
(b) a charger for supplying charging current in a charging process, the charging process comprising:
  (1) supplying a constant charging current at a rate of about 1–2 times the amount of current that would charge the rechargeable battery in one hour;
  (2) supplying charging current so as to maintain the first voltage to be at or below a maximum charging voltage;
  (3) supplying charging current so as to maintain the second voltage to be above the end-of-charge voltage and to be below the threshold voltage;
  (4) supplying charging current to maintain the third voltage to be at or below the end-of-charge voltage; and
  (5) terminating charging when the charging current falls below a lower limit, the lower limit being in the range from about 5% to about 20% of the constant charging current;
whereby the charger charges the rechargeable battery without allowing the first voltage to exceed the maximum charging voltage, without allowing the second voltage to exceed the threshold voltage of the protection circuit, and without allowing the third voltage to exceed the end-of-charge voltage.

36. The system of claim 35 further comprising a voltage detection circuit for measuring the second voltage, the output of the voltage detection circuitry being calibrated by charging the rechargeable battery in an initial charging phase.

37. The system of claim 35 wherein the charging process further comprises a measuring process for measuring the third voltage, the measuring process comprising:
  (1) repeatedly interrupting the supply of significant charging current;
  (2) while significant charging current is interrupted, measuring an open-circuit voltage across the terminals; and
  (3) resupplying charging current to the terminals to maintain the third voltage to be below the end-of-charge voltage.

38. The system of claim 35 wherein the maximum charging voltage is a function of:
  (1) the end-of-charge voltage;
  (2) the charging current; and
  (3) the internal resistance.

39. The system of claim 35 wherein the battery pack provides the values of a plurality of the maximum charging voltage, the constant current rate, the threshold voltage, and the end-of-charge voltage from an information storage device contained in the battery pack.

40. The system of claim 35 wherein the rechargeable battery comprises a plurality of cells and the protection circuit is further coupled to a plurality of cells.

41. The system of claim 35 wherein the battery pack provides the values of a plurality of the maximum charging voltage, the constant current rate, the threshold voltage, and the end-of-charge voltage from an information storage device contained in the battery pack.

42. A system for charging a rechargeable battery, the system comprising:
(a) a battery pack including
  (1) a plurality of terminals for accepting a charging current specified not to exceed a maximum charging current, a first voltage specified not to exceed a maximum charging voltage being developed across the terminals;
  (2) a rechargeable battery, coupled to the terminals, a second voltage being developed across the rechargeable battery, the rechargeable battery operating according to a model comprising:
    (A) an ideal battery, a third voltage specified not to exceed an end-of-charge voltage being developed across the ideal battery, the end-of-charge voltage being developed across the ideal battery when the rechargeable battery is fully charged,
    (B) an internal resistance, a voltage differential between the second voltage and the third voltage being developed across the internal resistance in proportion to the charging current, and
    (C) an information storage device for storing a plurality of charging parameters; and
(b) a battery charger for charging the rechargeable battery, the charger including an information receiver for receiving the charging parameters, the charger controlling the charging of the rechargeable battery in accordance with the plurality of charging parameters.

43. The system of claim 42, wherein the charging parameters include the charging current, specified not to exceed a maximum charging current.

44. The system of claim 42, wherein the charging parameters include the first voltage, specified not to exceed a maximum charging voltage.

45. The system of claim 42, wherein the charging parameters include the third voltage, specified not to exceed an end-of-charge voltage.

46. The system of claim 42, wherein the battery pack further includes a protection circuit, coupled to the rechargeable battery, for causing charging current to be stopped whenever the second voltage reaches a threshold voltage, and wherein the charging parameters include the threshold voltage.

47. The system of claim 42, wherein the information storage device comprises a resistor network.

48. The system of claim 42, wherein the information storage device comprises a non-volatile electronic memory device.

* * * * *

UNITED STATES PATENT AND TRADEMARK OFFICE
CERTIFICATE OF CORRECTION

PATENT NO : 5,994,878
DATED : November 30, 1999
INVENTOR(S) : Ostergaard et al.

It is certified that error appears in the above-identified patent and that said Letters Patent are hereby corrected as shown below:

RELATED FOREIGN APPLICATION DATA

This application claims benefit of Danish Application(s) (1) Danish Application No. DK 1124/97 filed Sep. 30, 1997, (2) Danish Application No. DK 1456/97 filed Dec. 15, and (3) Danish Application No. DK 0129/98 filed Jan. 29, 1998.

Signed and Sealed this

Twenty-fourth Day of April, 2001

Attest:

NICHOLAS P. GODICI

Attesting Officer

Acting Director of the United States Patent and Trademark Office